(12) United States Patent
Raslambekov

(10) Patent No.: US 11,166,787 B1
(45) Date of Patent: Nov. 9, 2021

(54) ORTHODONTIC ATTACHMENT SYSTEMS AND METHODS

(71) Applicant: Oxilio Ltd, Larnaca (CY)

(72) Inventor: Islam Khasanovich Raslambekov, Long Island City, NY (US)

(73) Assignee: ARKIMOS Ltd, Larnaca (CY)

( * ) Notice: Subject to any disclaimer, the term of this patent is extended or adjusted under 35 U.S.C. 154(b) by 0 days.

(21) Appl. No.: 17/143,080

(22) Filed: Jan. 6, 2021

(51) Int. Cl.
A61C 7/08 (2006.01)
G06T 7/00 (2017.01)
G06T 17/20 (2006.01)
A61C 7/00 (2006.01)

(52) U.S. Cl.
CPC .............. A61C 7/002 (2013.01); A61C 7/08 (2013.01); G06T 7/0012 (2013.01); G06T 17/205 (2013.01); A61C 2007/004 (2013.01); G06T 2207/30036 (2013.01)

(58) Field of Classification Search
None
See application file for complete search history.

(56) References Cited

U.S. PATENT DOCUMENTS

| 5,011,405 | A | 4/1991 | Lemchen |
| 5,975,893 | A | 11/1999 | Muhammad et al. |
| 6,183,248 | B1 | 2/2001 | Chishti et al. |
| 6,227,850 | B1 | 5/2001 | Chishti et al. |
| 6,309,215 | B1 | 10/2001 | Phan et al. |
| 6,318,994 | B1 | 11/2001 | Chishti et al. |
| 6,334,853 | B1 | 1/2002 | Kopelman et al. |
| 6,386,878 | B1 | 5/2002 | Pavlovskaia et al. |
| 6,398,548 | B1 | 6/2002 | Muhammad et al. |
| 6,463,344 | B1 | 10/2002 | Pavloskaia et al. |
| 6,471,511 | B1 | 10/2002 | Chishti et al. |
| 6,554,611 | B2 | 4/2003 | Chishti et al. |
| 6,602,070 | B2 | 8/2003 | Miller et al. |
| 6,665,570 | B2 | 12/2003 | Pavloskaia et al. |
| 6,685,470 | B2 | 2/2004 | Chishti et al. |
| 6,688,886 | B2 | 2/2004 | Hughes et al. |
| 6,705,863 | B2 | 3/2004 | Phan et al. |
| 6,726,478 | B1 | 4/2004 | Isiderio et al. |
| 6,739,870 | B2 | 5/2004 | Lai et al. |
| 6,767,208 | B2 | 7/2004 | Kaza |
| 6,905,337 | B1 | 6/2005 | Sachdeva |

(Continued)

FOREIGN PATENT DOCUMENTS

WO 98058596 A1 12/1998
WO 00019928 A1 4/2000
(Continued)

Primary Examiner — James A Thompson
(74) Attorney, Agent, or Firm — BCF LLP

(57) ABSTRACT

Method for determining a coupling point for an attachment on a tooth of a subject comprising: obtaining a digital 3D representation of the tooth to which the attachment will be coupled; obtaining attachment data indicative of the attachment to be coupled to the tooth; determining, on the digital 3D representation of the tooth, a plurality of excluded areas for the coupling point based on the digital 3D representation of the tooth and the attachment data; determining the coupling point by identifying an area on the tooth which is not in the plurality of excluded areas; and storing, in a memory of the computer system, the determined coupling point.

17 Claims, 12 Drawing Sheets

(56) References Cited

U.S. PATENT DOCUMENTS

| | | | |
|---|---|---|---|
| 6,979,196 B2 | 12/2005 | Nikolskiy et al. |
| 7,040,896 B2 | 5/2006 | Pavlovskaia et al. |
| 7,059,850 B1 | 6/2006 | Phan et al. |
| 7,063,532 B1 | 6/2006 | Jones et al. |
| 7,123,767 B2 | 10/2006 | Jones et al. |
| 7,125,248 B2 | 10/2006 | Phan et al. |
| 7,134,874 B2 | 11/2006 | Chishti et al. |
| 7,210,929 B2 | 5/2007 | Raby et al. |
| 7,220,122 B2 | 5/2007 | Chishti |
| 7,241,142 B2 | 7/2007 | Abolfathi et al. |
| 7,293,988 B2 | 11/2007 | Wen |
| 7,320,592 B2 | 1/2008 | Chishti et al. |
| 7,347,686 B2 | 3/2008 | Marshall |
| 7,373,286 B2 | 5/2008 | Nikolskiy et al. |
| 7,377,778 B2 | 5/2008 | Chishti et al. |
| 7,428,481 B2 | 9/2008 | Nikolskiy et al. |
| 7,442,040 B2 | 10/2008 | Kuo |
| 7,637,740 B2 | 12/2009 | Knopp |
| 7,689,398 B2 | 3/2010 | Cheng et al. |
| 7,690,917 B2 | 4/2010 | Marshall |
| 7,771,195 B2 | 8/2010 | Knopp et al. |
| 7,826,646 B2 | 11/2010 | Pavlovskaia et al. |
| 7,837,464 B2 | 11/2010 | Marshall et al. |
| 7,841,858 B2 | 11/2010 | Knopp et al. |
| 7,844,429 B2 | 11/2010 | Matov et al. |
| 7,865,259 B2 | 1/2011 | Kuo et al. |
| 7,904,307 B2 | 3/2011 | Abolfathi et al. |
| 7,905,725 B2 | 3/2011 | Chishti et al. |
| 7,940,258 B2 | 5/2011 | Stark et al. |
| 7,942,672 B2 | 5/2011 | Kuo |
| 7,993,134 B2 | 8/2011 | Wen |
| 8,038,444 B2 | 10/2011 | Kitching et al. |
| 8,044,954 B2 | 10/2011 | Kitching et al. |
| 8,108,189 B2 | 1/2012 | Chelnokov et al. |
| 8,131,393 B2 | 3/2012 | Matov et al. |
| 8,135,569 B2 | 3/2012 | Matov et al. |
| 8,194,067 B2 | 6/2012 | Raby et al. |
| 8,244,390 B2 | 8/2012 | Kuo et al. |
| 8,303,302 B2 | 11/2012 | Teasdale |
| 8,425,229 B2 | 4/2013 | Nilsson et al. |
| 8,439,672 B2 | 5/2013 | Matov et al. |
| 8,465,280 B2 | 6/2013 | Sachdeva et al. |
| 8,478,435 B2 | 7/2013 | Kuo et al. |
| 8,517,727 B2 | 8/2013 | Raby et al. |
| 8,639,477 B2 | 1/2014 | Chelnokov et al. |
| 8,641,414 B2 | 2/2014 | Borovinskih et al. |
| 8,734,150 B2 | 5/2014 | Wen |
| 8,780,106 B2 | 7/2014 | Chishti et al. |
| 8,807,999 B2 | 8/2014 | Kuo et al. |
| 8,896,592 B2 | 11/2014 | Boltunov et al. |
| 8,897,902 B2 | 11/2014 | See et al. |
| 8,961,173 B2 | 2/2015 | Miller |
| 9,060,829 B2 | 6/2015 | Sterental et al. |
| 9,107,722 B2 | 8/2015 | Matov et al. |
| 9,161,823 B2 | 10/2015 | Morton et al. |
| 9,211,166 B2 | 12/2015 | Kuo et al. |
| 9,326,831 B2 | 5/2016 | Cheang |
| 9,345,557 B2 | 5/2016 | Anderson et al. |
| 9,375,293 B2 | 6/2016 | Taub et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,503,282 B2 | 11/2016 | Kody et al. |
| 9,529,970 B2 | 12/2016 | Andreiko |
| 9,592,103 B2 | 3/2017 | Taub et al. |
| 9,610,140 B2 | 4/2017 | Anderson et al. |
| 9,622,834 B2 | 4/2017 | Chapoulaud et al. |
| 9,792,413 B2 | 10/2017 | Badawi |
| 9,844,424 B2 | 12/2017 | Wu et al. |
| 9,855,115 B2 | 1/2018 | Tam et al. |
| 10,011,050 B2 | 7/2018 | Kitching et al. |
| 10,028,804 B2 | 7/2018 | Schulhof et al. |
| 10,076,389 B2 | 9/2018 | Wu et al. |
| 10,098,709 B1 | 10/2018 | Kitching et al. |
| 10,307,222 B2 | 6/2019 | Morton et al. |
| 10,332,164 B2 | 6/2019 | Abolfathi et al. |
| 10,383,704 B2 | 8/2019 | Kitching |
| 10,405,947 B1 | 9/2019 | Kaza et al. |
| 10,405,951 B1 | 9/2019 | Kopelman et al. |
| 10,413,385 B2 | 9/2019 | Sherwood et al. |
| 10,433,934 B2 | 10/2019 | Kopelman |
| 10,463,452 B2 | 11/2019 | Matov et al. |
| 10,470,846 B2 | 11/2019 | Kopelman et al. |
| 10,524,880 B2 | 1/2020 | Wen |
| 10,553,309 B2 | 2/2020 | Trosien et al. |
| 10,561,476 B2 | 2/2020 | Matov et al. |
| 10,595,965 B2 | 3/2020 | Khardekar et al. |
| 10,617,489 B2 | 4/2020 | Grove et al. |
| 10,631,956 B1 | 4/2020 | Raslambekov |
| 10,650,517 B2 | 5/2020 | Parpara et al. |
| 10,653,503 B2 | 5/2020 | Boltunov et al. |
| 10,726,949 B1 | 7/2020 | Raslambekov et al. |
| 10,783,629 B2 | 9/2020 | Parpara et al. |
| 10,792,127 B2 | 10/2020 | Kopelman et al. |
| 10,813,721 B2 | 10/2020 | Sterental et al. |
| 2005/0244791 A1 | 11/2005 | Davis et al. |
| 2013/0034822 A1 | 2/2013 | Teasdale |
| 2013/0095446 A1 | 4/2013 | Andreiko et al. |
| 2014/0288894 A1 | 9/2014 | Chishti et al. |
| 2016/0302885 A1 | 10/2016 | Matov et al. |
| 2017/0035536 A1 | 2/2017 | Garcia et al. |
| 2017/0079748 A1 | 3/2017 | Andreiko |
| 2017/0165032 A1 | 6/2017 | Webber et al. |
| 2017/0231721 A1 | 8/2017 | Akeel et al. |
| 2017/0319296 A1 | 11/2017 | Webber et al. |
| 2018/0039755 A1 | 2/2018 | Matov et al. |
| 2018/0165818 A1 | 6/2018 | Tsai et al. |
| 2018/0235735 A1* | 8/2018 | Biehl .................... A61C 19/04 |
| 2018/0263731 A1* | 9/2018 | Pokotilov ............ A61C 9/0053 |
| 2018/0304497 A1 | 10/2018 | Kitching et al. |
| 2018/0325626 A1* | 11/2018 | Huang .................... A61C 7/08 |
| 2019/0000592 A1 | 1/2019 | Cam et al. |
| 2019/0029522 A1* | 1/2019 | Sato .................... A61C 9/0053 |
| 2019/0046295 A1 | 2/2019 | Morton et al. |
| 2019/0282333 A1 | 9/2019 | Matov et al. |
| 2019/0298494 A1 | 10/2019 | Webber et al. |
| 2019/0314117 A1 | 10/2019 | Morton et al. |
| 2019/0357997 A1 | 11/2019 | Shi et al. |
| 2019/0388189 A1 | 12/2019 | Shivapuja et al. |
| 2020/0000551 A1 | 1/2020 | Li et al. |
| 2020/0000552 A1 | 1/2020 | Mednikov et al. |
| 2020/0125069 A1* | 4/2020 | Sirovskiy ................ G06T 19/20 |
| 2020/0146776 A1 | 5/2020 | Matov et al. |
| 2020/0229900 A1* | 7/2020 | Cunliffe ............... A61C 9/0053 |
| 2020/0297459 A1 | 9/2020 | Grove et al. |
| 2020/0306012 A1 | 10/2020 | Roschin et al. |

FOREIGN PATENT DOCUMENTS

| | | |
|---|---|---|
| WO | 00019930 A1 | 4/2000 |
| WO | 00019931 A1 | 4/2000 |
| WO | 00069356 A1 | 11/2000 |
| WO | 00069357 A1 | 11/2000 |
| WO | 01074268 A1 | 11/2001 |
| WO | 2018085718 A2 | 5/2018 |
| WO | 2019089989 A2 | 5/2019 |

* cited by examiner

ORTHODONTIC ATTACHMENT SYSTEMS AND METHODS

The present technology relates to systems and methods relating to orthodontic attachments, and more specifically but not exclusively to orthodontic attachments configured to be attached to teeth of a subject for use with an aligner to be worn over the teeth of the subject.

BACKGROUND

In orthodontics, treatments for achieving alignment of malposed teeth in a subject include applying dental appliances, such as orthodontic aligners, to subject's teeth. Orthodontic aligners are typically worn over teeth of an arch form in order to exert a force to the subject's teeth to move them towards a desired position.

Orthodontic aligners are typically custom-made to the subject's teeth and designed to exert the predetermined force causing the teeth to move in a desired direction associated with their alignment within the arch form. Generally, an internal shape of the aligner, among other factors, defines the effective forces to be exerted to the teeth and the effective correction that may be attained. Certain methods of designing such an aligner may comprise obtaining a 3D representation of the arch form, and based thereon, determining the required treatment plan for the teeth requiring alignment, which may comprise multiple sequential treatment steps in which different aligners, each with a different internal configuration, are to be worn by the subject.

In certain circumstances, there is a necessity to attach one or more attachments to the teeth of the subject, which in conjunction with the aligner worn over the teeth, will exert an additional force to move the teeth.

Attachments may be needed in situations where a configuration of a given tooth, such as its size, shape or angulation, make it difficult for the aligner alone to exert the required force, and/or where the desired movement of the tooth requires an anchor point for certain desired tooth movements.

Conventional attachments include those that are horizontally beveled rectangular or vertically aligned rectangular configurations, having a thickness of about $1/16^{th}$ inches. Conventionally, different types of teeth will require different configurations of attachment.

Placement of the attachment is an important part of a successful orthodontic treatment.

Certain prior art approaches have been proposed to address the technical problem of attachment placement for orthodontic treatment considering at least some of the above-identified requirements.

U.S. Pat. No. 9,326,831 issued on May 3, 2016, assigned to Align Technology, Inc., and entitled "SYSTEM AND METHOD FOR POSITIONING THREE-DIMENSIONAL BRACKETS ON TEETH" describes systems and methods for positioning 3D virtual brackets on teeth for the precise positioning of conventional brackets and wire. Various reference features may be calculated for the teeth and used to calculate a position for the virtual bracket. Reference features that are calculated include curve of Spee, Andrew's plane, and a facial axis of the clinical crown for the teeth.

U.S. Pat. No. 9,503,282 issued on Nov. 22, 2016, assigned to 3M Innovative Properties Company, and entitled "METHODS AND SYSTEMS FOR DETERMINING THE POSITIONS OF ORTHODONTIC APPLIANCES" describes determining positions of orthodontic appliances such as brackets and buccal tubes on a patient's teeth using digital data that represents the shapes of the patient's teeth. Certain landmarks of the teeth such as the marginal ridges are determined using software, and the software adjusts positions of the virtual appliances on the teeth as needed in order to bring the marginal ridges into proper alignment at the conclusion of treatment. The resulting positions are optionally used to determine the location of the appliances in an indirect bonding apparatus such as a transfer tray.

SUMMARY

It is an object of the present technology to ameliorate at least some of the inconveniences present in the prior art.

The developers of the present technology have appreciated that an automated determination of a coupling point of an attachment to a given tooth can ensure an accurate implementation of an orthodontic treatment plan. Subject discomfort can be minimized or reduced. The orthodontic treatment plan can be more efficiently administered.

Therefore, these methods and systems could allow for determining more effective, efficient, and safer orthodontic treatments.

More specifically, according to a first broad aspect of the present technology, there is provided a method for determining a coupling point for an attachment on a tooth of a subject, the method executable by a processor of a computer system, the method comprising: obtaining a digital 3D representation of the tooth to which the attachment will be coupled; obtaining attachment data indicative of the attachment to be coupled to the tooth; determining, on the digital 3D representation of the tooth, a plurality of excluded areas for the coupling point based on the digital 3D representation of the tooth and the attachment data; and determining the coupling point by identifying an area on the tooth which is not in the plurality of excluded areas; storing, in a memory of the computer system, the determined coupling point. In certain embodiments, the digital 3D representation of the tooth is part of a digital 3D representation of an arch form of the subject.

In certain embodiments, wherein at least one of the excluded areas of the plurality of areas comprises a heat map indicative of degrees of exclusion.

In certain embodiments, the method further comprises normalizing gradients within each heatmap and displaying maximum values of normalized gradients as the heat map.

In certain embodiments, the heat map comprises one or more bands representative of the degrees of exclusion.

In certain embodiments, the plurality of excluded areas are defined by one or more of:

(i) a first excluded area, within which if the attachment were to be coupled to the tooth, there would be contact between the attachment and one or more teeth of an opposite arch form;

(ii) a second excluded area, within which if the attachment were to be coupled to the tooth, there would be contact between the attachment and one or more neighbouring teeth of the same arch form;

(iii) a third excluded area on a lingual surface of the given tooth, (iv) a fourth excluded area on a buccal surface of the given tooth, (v) a fifth excluded area which is within a predetermined distance of a gum line of the given tooth, (vi) a sixth excluded area which is within a predetermined distance of an edge of an appliance to be worn over the arch form, (vii) a seventh excluded area based on a desired 90° angle between a normal axis of a vector on the digital 3D representation of the tooth and the tooth axis of the given tooth.

In certain embodiments, the plurality of excluded areas includes a first excluded area which is defined by the attachment, if positioned in the first excluded area, contacting at least one opposing tooth of a plurality of opposing teeth of an opposite arch form, the method comprising: obtaining a digital 3D representation of an opposite arch form; for different locations on the given tooth, determining a distance from a closest point on the plurality of teeth of the opposite arch form, based on the digital 3D representations of the tooth and the opposing arch form; and determining the first excluded area as those locations on the given tooth which are within a predetermined distance from the determined closest point of the opposing teeth.

In certain embodiments, the digital 3D representations of the tooth and the opposite arch form comprise meshes indicative of a surface of the given tooth and the opposing teeth, and determining the closest point on the plurality of teeth of the opposite arch form comprises, for each vertex of the digital 3D representation of the given tooth, identifying the closest vertex of the digital 3D representation of the opposing arch form.

In certain embodiments, the predetermined distance is based on a height of the attachment, and optionally a thickness of an appliance to be worn over the arch form.

In certain embodiments, the plurality of excluded areas includes a second excluded area defined by the attachment, when positioned on the given tooth, contacting a neighboring tooth of the arch form, the method comprising: for different locations on the given tooth, determining a distance from a closest point on the neighboring tooth, based on the digital 3D representation of the given tooth and a digital 3D representation of the neighboring tooth; and determining the second excluded area as those locations on the given tooth which are within a predetermined distance from the determined closest point of the neighboring tooth.

In certain embodiments, the digital 3D representations of the tooth and the neighboring tooth comprises a mesh indicative of a surface of the given tooth and the neighboring tooth, and determining the closest point on the neighboring tooth comprises, for each vertex of the digital 3D representation of the given tooth, identifying the closest vertex of the digital 3D representation of the neighboring tooth.

In certain embodiments, the predetermined distance is based on a height of the attachment, and optionally a thickness of an appliance to be worn over the arch form.

In certain embodiments, the plurality of excluded areas includes a third excluded area defined by at least a portion of a lingual surface of the given tooth, the method comprising: determining a distal-mesial plane extending through a tooth axis of the given tooth; determining a lingual side of the distal-mesial plane on the given tooth as the third excluded area.

In certain embodiments, the method further comprises displacing the determined distal-mesial plane away from the lingual side by a predetermined distance, and determining the lingual side of the displaced distal-mesial plane as the third excluded area.

In certain embodiments, the plurality of excluded areas includes a fourth excluded area defined by at least a portion of a lingual surface of the given tooth, wherein the digital 3D representation of the tooth comprises a mesh representing a surface of the given tooth, the method comprising: obtaining a normal axis of each vector of the mesh of the given tooth; and determining an angle of the normal axis with a Z axis of a distal-mesial plane extending through a tooth axis of the given tooth; and determining a lingual side of the angled distal-mesial plane on the given tooth as the fourth excluded area.

In certain embodiments, the plurality of excluded areas includes a fifth excluded area defined by a gum line of the arch form, the method comprising: obtaining a gum line associated with the given tooth in the arch form; displacing the gum line by a given distance along a front surface of the given tooth, the gum line and the displaced gum line defining the fifth excluded area.

In certain embodiments, the plurality of excluded areas includes a sixth excluded area defined by an edge of an appliance to be worn over the arch form, the method comprising: obtaining an appliance edge position along the given tooth of the edge of the appliance when worn over the arch form; and displacing the appliance edge position by a predetermined distance along a front surface of the given tooth, the gum line and the displaced appliance edge position defining the sixth excluded area.

In certain embodiments, the plurality of excluded areas includes a seventh excluded area defined by at least a portion of a buccal surface of the given tooth, wherein the digital 3D representation of the tooth comprises a mesh representing a surface of the given tooth, the method comprising: obtaining a normal axis of each vector of the mesh of the given tooth; and determining a given vector as forming part of the seventh excluded area if an angle of the normal axis with a tooth axis of the given tooth is within a predetermined angle range.

In certain embodiments, the method further comprises: determining at least one optimal area for coupling the attachment to the given tooth, wherein the digital 3D representation comprises a mesh representative of a surface of the given tooth, the determining comprising: obtaining, for each vector of the mesh of the given tooth, a normal vector; obtaining an attachment axis of the attachment; defining the at least one optimal area by determining that a given vector of the mesh is within the at least one optimal area if an angle between the normal vector and the attachment axis is within a predefined range; determining the coupling point on the given tooth based on it being in the at least one optimal area, and not within any of the plurality of excluded areas.

The method may utilize any number of and any combinations of the first excluded area, the second excluded area, the third excluded area, the fourth excluded area, the fifth excluded area, the sixth excluded area, the seventh excluded area, and the optimal area. For example, in certain embodiments, the first and second excluded areas may be used in combination with the optimal area.

In certain embodiments, the method further comprises displaying and/or storing the determined coupling point.

In certain embodiments, the method further comprises causes manufacturing of the attachment and/or the aligner for the subject.

From another aspect, there is provided a system for determining a coupling point for an attachment on a tooth of a subject. The system comprises a processor of a computer system, the processor configured to execute a method comprising: obtaining a digital 3D representation of the tooth to which the attachment will be coupled; obtaining attachment data indicative of the attachment to be coupled to the tooth; determining, on the digital 3D representation of the tooth, a plurality of excluded areas for the coupling point based on the digital 3D representation of the arch form and the attachment data; and determining the coupling point by identifying an area on the tooth which is not in the plurality of excluded areas; and storing, in a memory of the computer system, the determined coupling point.

The system may include, in certain embodiments, an imaging device for acquiring the imaging data.

It will be appreciated that in certain aspects and embodiments, the method may be defined in terms of permissible areas instead of excluded areas. For example, from another aspect, there is provided a method for determining a coupling point for an attachment on a tooth of a subject, the method executable by a processor of a computer system, the method comprising: obtaining a digital 3D representation of a tooth of the subject; obtaining attachment data indicative of the attachment to be coupled to the tooth; determining, on the digital 3D representation of the tooth, a plurality of permissible areas for the coupling point based on the digital 3D representation of the tooth and the attachment data, at least some of the permissible areas having been determined by determining an excluded area on the given tooth, and determining areas that are not excluded areas as permissible areas on the given tooth; and determining the coupling point by identifying an area on the tooth which is in the plurality of permissible areas.

From a yet further aspect, there is provided an attachment for applying an orthodontic treatment to teeth of a subject, the attachment comprising an attachment body having a circular-based cone configuration, the attachment body having an attaching end configured to be attached to a tooth of the subject and a free end. The free end has a free end radius which is smaller than an attachment end radius, and wherein the free end is rounded.

In certain embodiments, the attachment has an attachment axis, the attachment body being symmetrically disposed about the attachment axis. In certain embodiments, a height of the attachment body is less than a diameter at the attaching end of the attachment body.

In certain embodiments, a diameter of the attachment end is 1.90 cm, and a height of the attachment is 1.30 cm. The rounded free end may have a radius of curvature of 0.45 cm.

From another aspect, there is provided a system for providing an orthodontic treatment, the system comprising at least one aligner configured to be worn over teeth of an arch form of a subject, and one or more attachments, as described above, configured to be attached to the one or more teeth of the subject.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations or embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
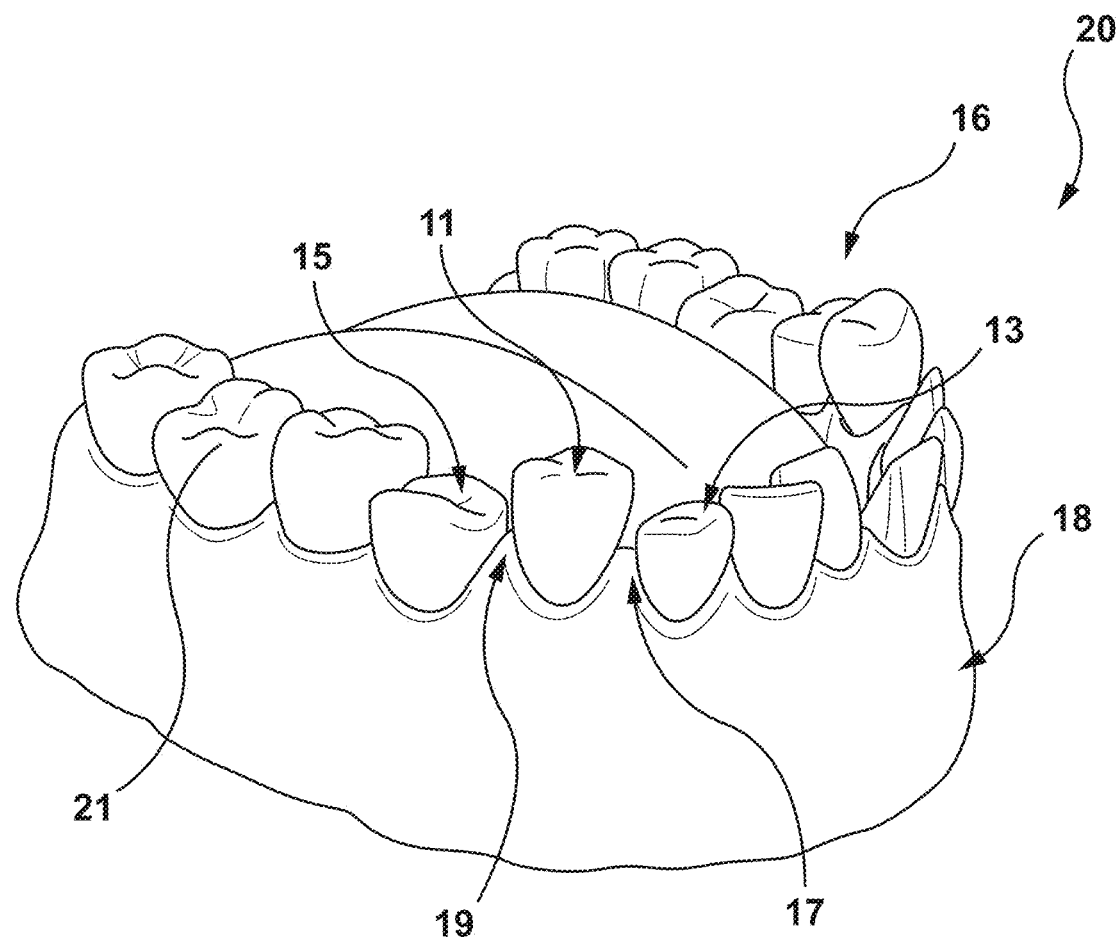
FIG. 1 depicts a bottom view of a lower arch form of a subject exemplifying a misalignment of some of a patient's teeth, in accordance with certain non-limiting embodiments of the present technology.

Certain aspects and embodiments of the present technology are directed to orthodontic attachment methods and systems, including: a determination of a coupling position on a tooth of a given orthodontic attachment; methods and systems of orthodontic treatment using orthodontic attachments; as well as configurations of the orthodontic attachment.

More specifically, certain aspects and embodiments of the present technology comprise a computer-implemented method for determining a coupling point for an attachment on a tooth of a subject, based on a digital 3D representation of the tooth, as part of planning and implementing an orthodontic treatment. In certain aspects and embodiments of the present technology, the coupling point determination is based on limiting interference of the attachment with subject's other teeth and optimisation of forces to be applied by engagement of the attachment with an aligner worn over the subject's teeth. In certain aspects and embodiments of the present technology, an interception of an attachment axis of the attachment and a tooth axis of the tooth is considered for determining the coupling point.

In the context of the present specification, the term "orthodontic treatment" is broadly referred to as any type of medical intervention aimed at correcting malocclusions associated with the teeth of the patient, including surgical and non-surgical manipulations, such as, but not limited to, using one or more of aligners, attachments, brackets, multi-strand wires, strips, retainers, and plates. Further, the orthodontic treatment, as referred to herein, may be determined automatically by a specific software, based on respective image data and input parameters associated with the subject, or semi-automatically with input from a professional practitioner in the field of dentistry (such as an orthodontist, a maxillofacial surgeon, for example).

Further, in the context of the present specification, the term "tooth axis" of the given tooth is referred to as a line extending through the given tooth lengthwise, through a crown portion and a root portion thereof. In certain embodiments, the tooth axis may be positioned such that a mass of the given tooth as well as anatomical features (such as lobes, developmental grooves, and marginal ridges thereof, for example) thereof are distributed substantially symmetrically about the tooth axis.

Certain nonlimiting embodiments of the present technology minimize, reduce or avoid some of the problems noted in association with the prior art. For example, by implementing certain embodiments of the present technology in respect of determining a coupling point for the attachment, the following advantages may be obtained: achieving more predictable forces and ability to follow closely a modeled orthodontic treatment; and more efficient and safer tooth movements of the given tooth in the course of the orthodontic treatment. In this regard, methods and systems provided herein, according to certain non-limiting embodiments of the present technology, may allow reducing an overall duration of the orthodontic treatment. For example, reducing the overall duration of the orthodontic treatment may be achieved by applying a fewer number of orthodontic devices (such as aligners) causing respective tooth movements of the given tooth towards the desired position.

Orthodontic Treatment

Referring initially to FIG. 1, there is depicted a perspective view of a lower arch form 20 of the subject, to which certain aspects and non-limiting embodiments of the present technology may be applied. The lower arch form 20 is also referred to as "mandibular arch form".

As can be appreciated, the lower arch form 20 includes lower teeth 16 and a lower gingiva 18. The lower teeth 16 each have a tooth surface 21. Further, in the depicted embodiments of FIG. 1, at least, a first tooth 11, a second tooth 13, and a third tooth 15 are misaligned within the lower arch form 20.

Also, as may be appreciated from FIG. 1, the first tooth 11 and the second tooth 13 define a first interdental space 17 therebetween; and the first tooth 11 and the third tooth 15 define a second interdental space 19 therebetween. For example, a given one of the first interdental space 17 and the second interdental space 19 may be an independent orthodontic disorder, such as excessive spacing between respective ones of the lower teeth 16. In another example, the given one of the first interdental space 17 and second interdental space 19 may be a result of a tooth loss.

Thus, for resolving the present orthodontic disorders of the lower teeth 16, an orthodontic treatment may be provided to the lower teeth 16 of the subject.

In accordance with certain non-limiting embodiments of the present technology, the orthodontic treatment may comprise applying an orthodontic device to the lower teeth 16. Generally speaking, the orthodontic device may be configured to exert a respective predetermined force onto at least one of the first tooth 11, the second tooth 13, and the third tooth 15 causing them to move towards an aligned position, such as, a position associated with normal occlusion between the lower teeth 16 and upper teeth (not depicted) of the subject. More specifically, in the depicted embodiment of FIG. 1, the orthodontic device may be configured to cause the first tooth 11 to move outwardly between the second tooth 13 and the third tooth 15, and further cause intrusion thereof in tissues of the lower gingiva 18. Further, the orthodontic device may be configured to cause the second tooth 13 to rotate clockwise around its tooth axis, and to cause the third tooth 15 to move inwardly relative to the lower arch form 20.

In various non-limiting embodiments of the present technology, the orthodontic device may comprise orthodontic appliances of different types, shapes, sizes and configurations, such as those including, without limitation, aligners, brackets, multi-strand wires, strips, retainers, and plates.

Figure 2A:
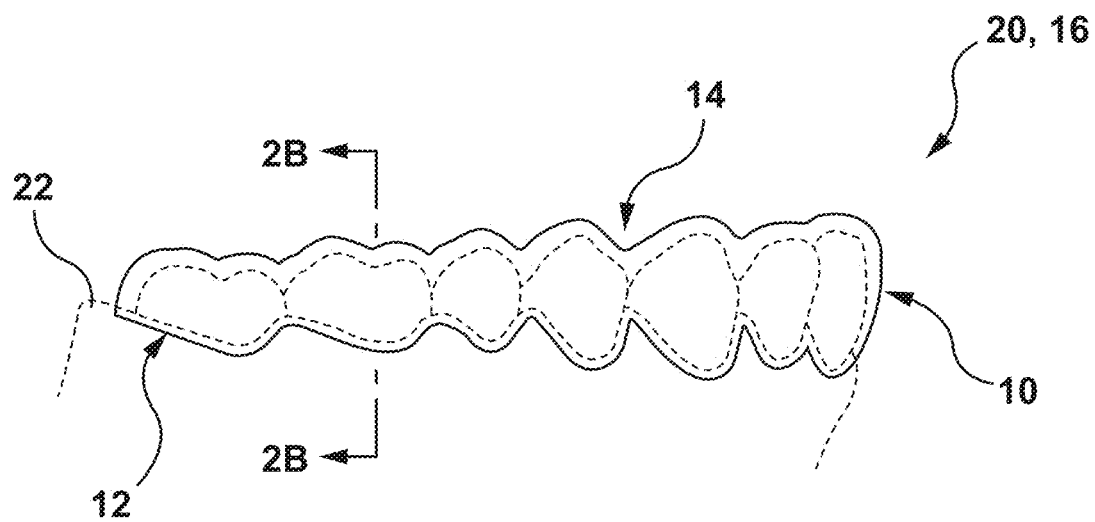
FIGS. 2A and 2B depict side and cross-sectional views, respectively, of a dental appliance applied to the patient's teeth that may be configured to treat the misalignment of the patient's teeth present in FIG. 1, in accordance with certain non-limiting embodiments of the present technology.
Figure 2B:
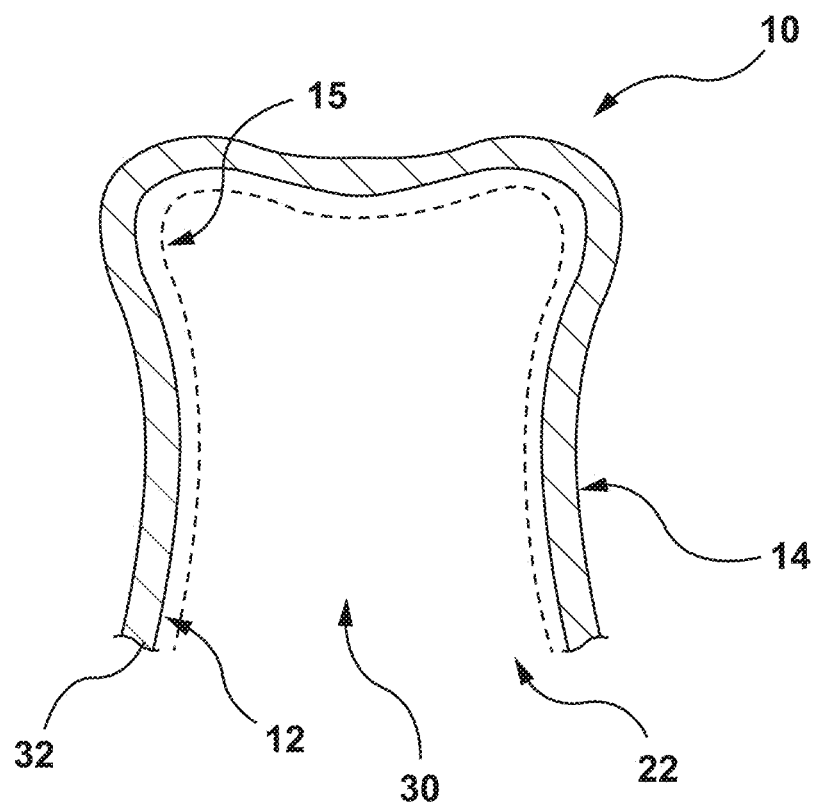

In specific non-limiting embodiments of the present the present technology, the orthodontic device includes an aligner. With reference to FIGS. 2A and 2B, there is depicted an embodiment of an aligner 10 applied to at least some of the lower teeth 16, in accordance with certain non-limiting embodiments of the present technology. The aligner 10 comprises an inner surface 12 and an outer surface 14. The inner surface 12 defines a channel 30, which is configured, in some non-limiting embodiments of the present technology, for receiving crown portions of at least some of the lower teeth 16 including the first tooth 11, the second tooth 13, and the third tooth 15. In certain embodiments of the present technology, the channel 30 of the aligner 10 is configured to receive crown portions of all of the lower teeth 16. The channel 30 has an edge 32 (also referred to herein as an "open edge"), which in certain embodiments may be shaped to follow a gum line 22 (also referred to as tooth-gingiva boundary 22 herein) along the lower gingiva 18.

It will be appreciated that, in accordance with certain non-limiting embodiments of the present technology, the aligner 10 may be used for treating different types of teeth misalignment or malocclusion, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 10 to the lower teeth 16 may further include applying specific attachments to one or more of the lower teeth 16.

The inner surface 12 of the aligner 10 is configured to impose respective forces on one or more of the lower teeth 16, such as the first tooth 11, the second tooth 13, and the third tooth 15, to obtain a desired position of the lower teeth 16 at a given stage of the orthodontic treatment. In certain embodiments, it can be said that the inner surface 12 of the aligner 10 is representative of a desired position of the lower teeth 16 at the given stage of the orthodontic treatment.

The aligner 10 configuration, for imposing the respective forces or otherwise imparting the orthodontic treatment, may also be defined by other factors, such as the aligner size, form factor (such as a U-shape or a V-shape, for example), material, and thickness. In some non-limiting embodiments of the present technology, the thickness of the aligner 10 may be about 0.7 mm. In other non-limiting embodiments of the present technology, the thickness is selected from 0.7 mm, 0.75 mm, 0.8 mm, 0.85 mm, 0.9 mm, 0.95 mm, and 1.0 mm. In yet other non-limiting embodiments of the present technology, the aligner 10 may have regions of variable thickness.

According to certain non-limiting embodiments of the present technology, the aligner 10 may be made of a polymer, such as a thermoplastic material. In other non-limiting embodiments of the present technology, the aligner 10 may be made of polyvinyl chloride (PVC). In yet other non-limiting embodiments of the present technology, the aligner 10 may be made of polyethylene terephthalate glycol (PETG). Other suitable materials can also be used to form the aligner 10.

Needless to say, although in the depicted embodiments of FIGS. 2A and 2B the aligner 10 is configured to be applied to the lower teeth 16, in other non-limiting embodiments of the present technology the aligner 10 may be configured to be applied to the upper teeth (not depicted) of the subject for conducting the orthodontic treatment.

In some non-limiting embodiments of the present technology, the aligner 10 may be manufactured using additive manufacturing techniques, such as 3D printing techniques where the aligner 10 is formed through printing according to a pre-generated 3D representation thereof.

However, in other non-limiting embodiments of the present technology, the aligner 10 may be produced by a shaping process comprising, broadly (i) producing an unfinished aligner using a preform which is shaped, using pressure and/or heat, on a respective aligner mold (not depicted). The mold is configured to shape the inner surface 12 of the aligner 10 according to a respective stage of the orthodontic treatment. The unfinished aligner includes excess material which can be considered as an artefact of the molding process; and (ii) cutting the unfinished aligner along a cut line to remove the excess material therefrom, thereby producing the aligner 10, the cut line defining the at least one edge 32 of the channel 30 of the aligner 10.

Figure 3:
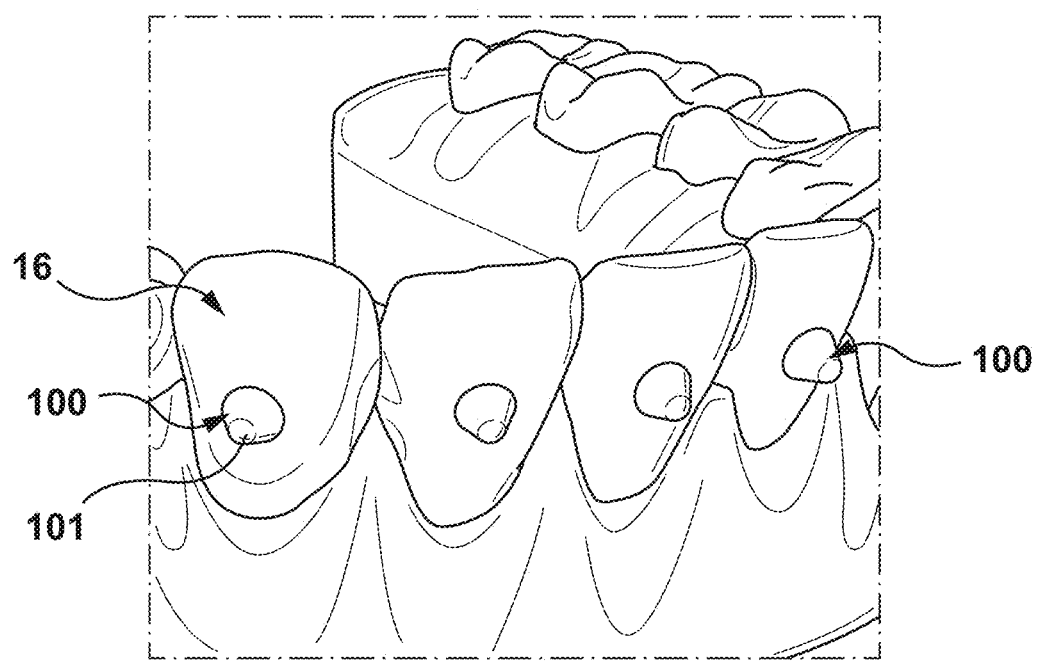
FIG. 3 depicts attachments coupled to the patient's teeth, a coupling point of each attachment having been determined in accordance with certain non-limiting embodiments of the present technology.

Referring to FIG. 3, in certain embodiments, there are provided one or more attachments 100 configured to attach to one or more of the lower teeth 16 at a respective coupling point 101 on the given tooth and to engage with the inner surface 12 of the aligner 10 when the aligner 10 is worn over the lower teeth 16 of the subject. The engagement of the attachment with the aligner 10 is configured to apply a force to the given tooth as part of the orthodontic treatment. The aligner 10 is arranged to be slipped on and off the arch form, whilst the one or more attachments are configured to remain attached to the one or more of the lower teeth during the orthodontic treatment.

Any type of attachment can be used with the present technology. Examples of attachments include anchors, button and brackets. The aligner 10 may be configured to grip the attachment. Certain conventional attachments are available in standard shapes and sizes.

According to certain aspects and embodiments of the present technology, with reference to FIGS. 4 and 5, the attachment 100 will be described in further detail below. Embodiments of the attachment 100 may be used with certain methods of the present technology.

Figure 4:
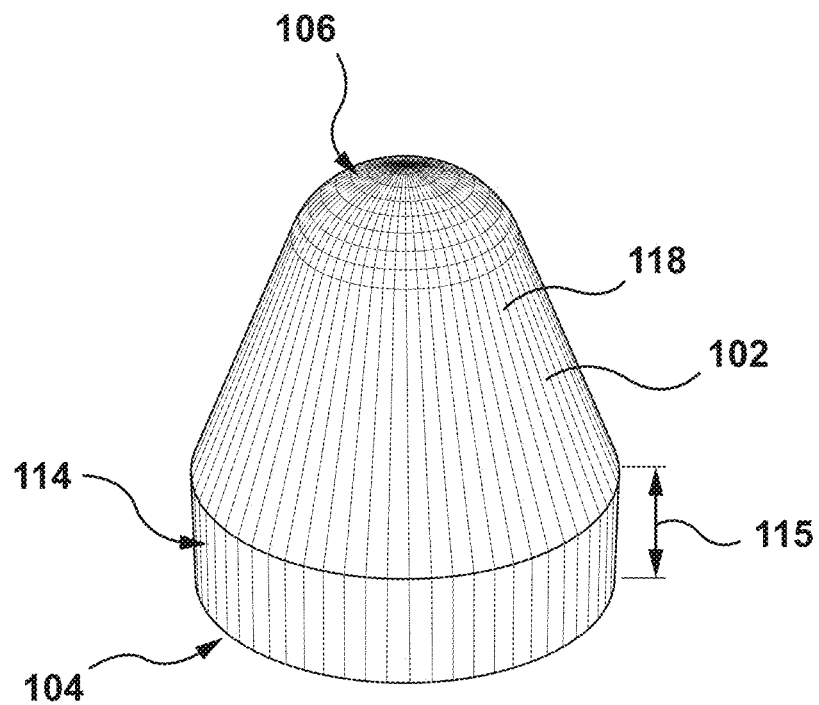
FIG. 4 depicts a schematic diagram of an attachment for coupling to a tooth of the patient, in accordance with certain non-limiting embodiments of the present technology.
Figure 5:
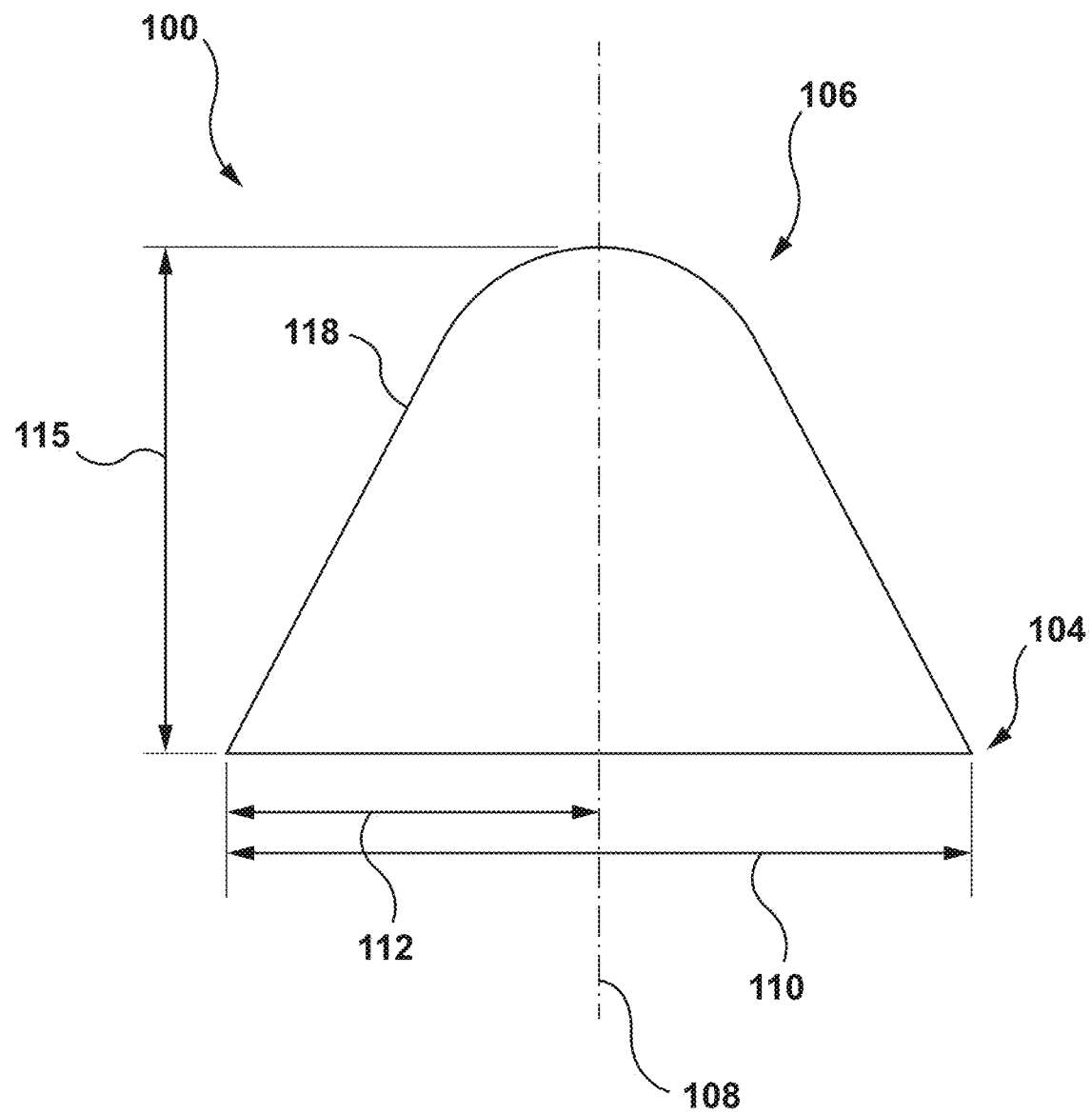
FIG. 5 depicts a schematic diagram of the attachment of FIG. 4 with certain dimensions, in accordance with certain non-limiting embodiments of the present technology.

As best seen in FIGS. 4 and 5, the attachment 100 has a circular-based conical configuration. The attachment 100 comprises an attachment body 102 having an attaching end 104 and a free end 106. The free end 106 is rounded. The attaching end 104 has an attachment surface (not shown) configured to be attached to a tooth of the subject, such as one of the lower teeth 16. The free end 106 engages with the inner surface 12 of the aligner 10, in use.

The attachment body 102 has an attachment axis 108 extending from the attaching end 104 to the free end 106. In certain embodiments, the attachment body 102 is symmetrically disposed about the attachment axis 108.

The attachment body 102 has a circular cross-sectional profile, when taken in a plane transverse to the attachment axis 108. A diameter 110 of the cross-sectional profile decreases from the attaching end 104 to the free end 106. In other words, the attachment body 102 is cone shaped with a radius 112 which is smaller at the free end 106 than at the attaching end 104.

In certain embodiments, there is optionally provided a base portion 114 adjacent the attaching end 104, the diameter 110 at the base portion 114 being constant along a height 115 of the base portion 114.

Referring now to FIG. 5, in certain embodiments, the attachment 100 is sized as illustrated. The diameter 110 at a widest portion of the attachment body 102 is larger than a height 116 of the attachment body 102. Specifically, the diameter 110 at the attaching end 104 is about 1.90 mm. The height 116 of the attachment body 102 is about 1.30 mm. A maximum diameter/height ratio is about 0.7. In other embodiments, the maximum height/diameter ratio is about 0.2, 0.25, 0.3, 0.4, 0.5, about 0.6, about 0.8, or about 0.95. In certain embodiments, the maximum height/diameter ratio of the attachment 100 is between about 0.2 to about 0.3. It will be appreciated that the maximum height/diameter ratio of the attachment 100 for the given tooth is selected with consideration of ease of putting on and removal of the aligner 10 over the given tooth with the attachment 100. Certain considerations in selecting the maximum height/diameter ratio of the attachment 100 include: an inclination of the given tooth and a position of the given tooth after the orthodontic treatment. For example, if the given tooth is inclined prominently, then the maximum height/diameter ratio is selected such that it is not too high to interfere with aligner installation and removal, and not too small so as to not contact the aligner 100 sufficiently.

The free end 106, which is rounded, has a radius of curvature of about 0.45 mm. An angle of an outer wall 118 with the attachment surface at the attaching end 104 is about 62.5°.

It has been found that certain geometries, such as the geometry shown in FIG. 5, is suitable for use with different types of teeth, such as canine, molars, premolars, etc. Embodiments of the attachment body 102 and its symmetrical geometry may also facilitate modeling and parametrization. Further, certain embodiments of the attachment 100 provide ease of putting on and pulling off the aligner 10 over the attachments 100 when the attachments 100 are attached to the one or more lower teeth 16. The symmetrical geometry of the attachment body 102 enables force to be applied uniformly, in a plane of the tooth surface 21 at a point of contact with the aligner 10.

The attachment 100 may be made by conventional manner, such as by molding, additive manufacturing, and the like. The attachment 100 may be made of a dental composite material such as an acrylic glass or an acrylic resin. The dental composite may be a photopolymerizable material, such as a material that can be polymerized with ultraviolet light.

The attachment is configured to be attachable to the tooth in any suitable manner, such as by application and curing of an orthodontic adhesive and/or cement.

Figure 6:
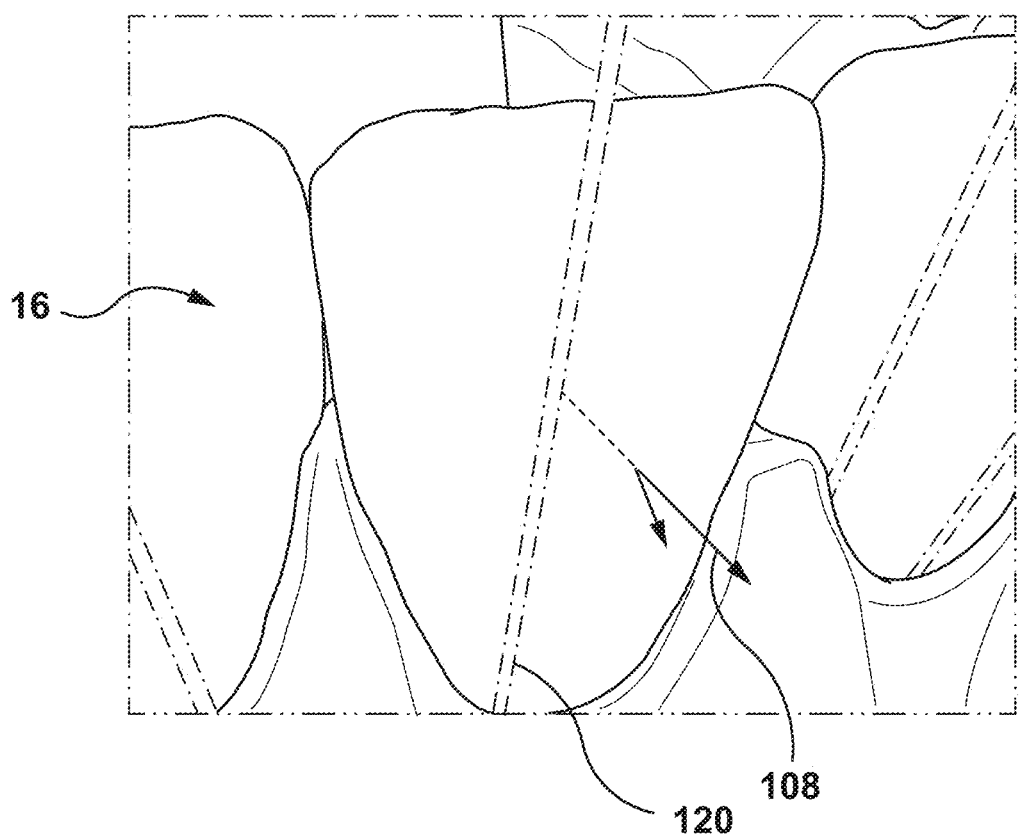
FIG. 6 depicts a zoomed-in digital 3D representation of the patient's teeth with a tooth axis illustrated, in accordance with certain embodiments of the present technology.
Figure 7:
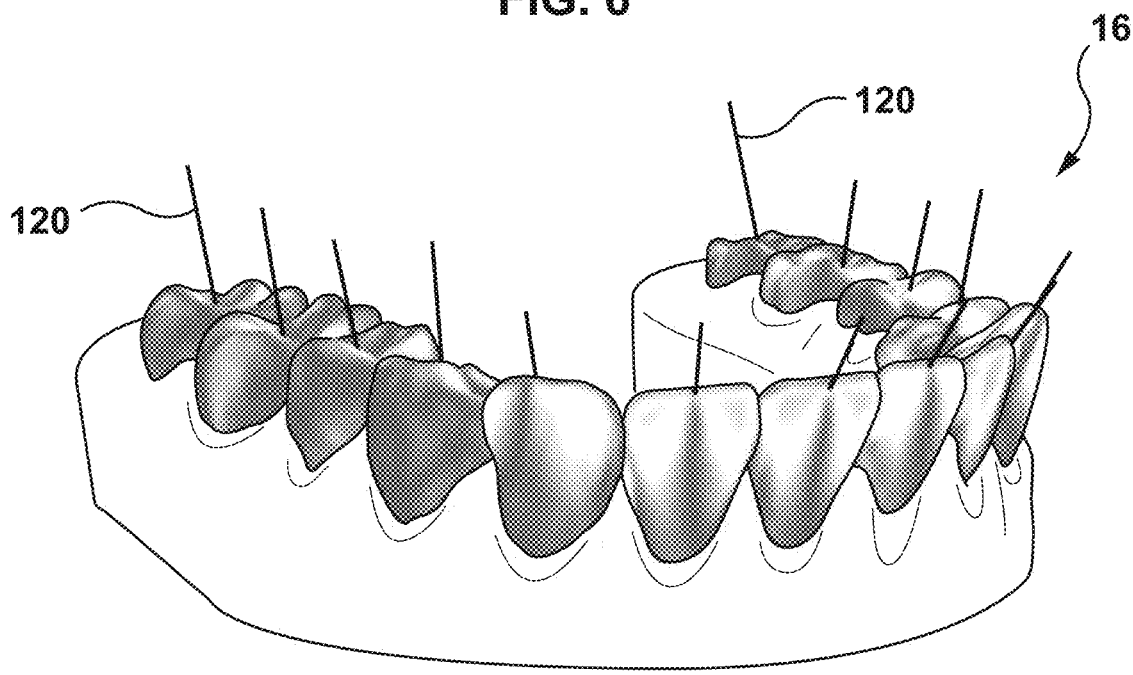
FIG. 7 depicts a zoomed-out view of the digital 3D representation of FIG. 6, in accordance with certain embodiments of the present technology.

Developers have further appreciated that a position of placement of an attachment, such as the attachment 100, on the tooth surface 21 is critical in enacting a planned orthodontic treatment, in terms of obtaining applied forces that match a modeled force or treatment. Conventionally, attachments are positioned such that the attachment axis is co-linear with a tooth surface normal axis. However, developers have identified that it is more optimal to position the attachment, such as the attachment 100, such that an attachment axis, such as the attachment axis 108, intersects a tooth axis 120 (FIG. 6). FIG. 7 illustrates a zoomed-out version of FIG. 6 and showing the lower teeth 16 with their respective tooth axis 120. The tooth axis 120 is a longitudinal axis that may pass through a central point of the tooth, such as a central point of resistance of the tooth.

Determination of the coupling position on the tooth of the given orthodontic attachment, according to certain non-limiting embodiments of the present technology, will be described in greater detail below with reference to embodiments of a method 1000 and FIGS. 11 to 20.

System

Figure 8:
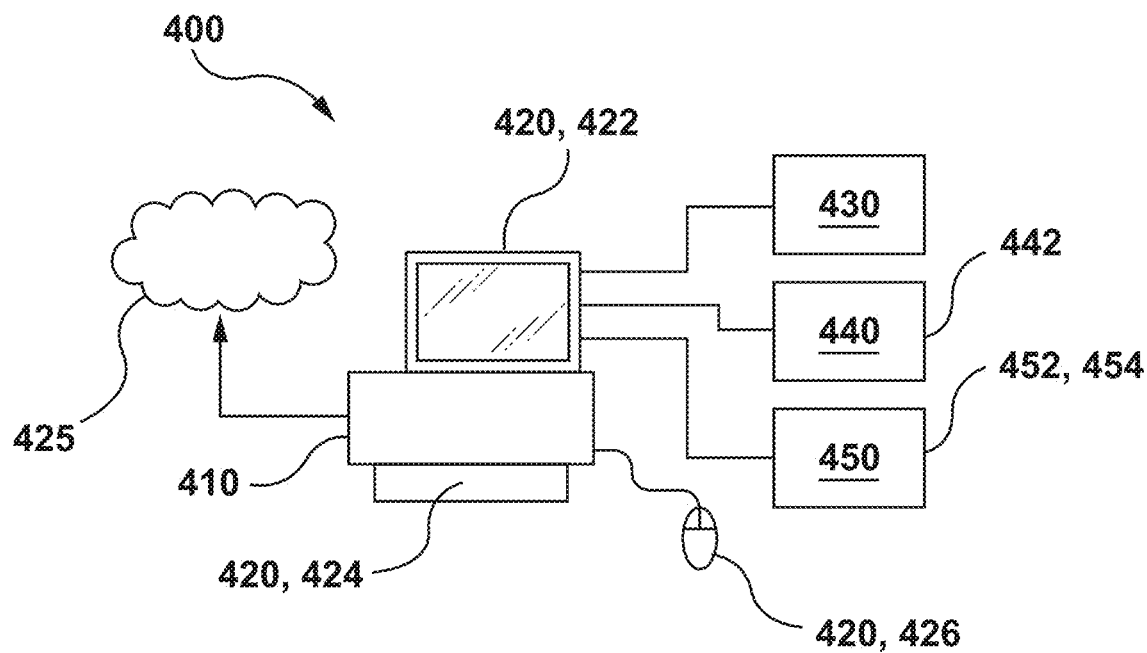
FIG. 8 depicts a schematic diagram of a system for determining the coupling point depicted in FIG. 3, in accordance with certain embodiments of the present technology.

Referring to FIG. 8, there is depicted a schematic diagram of a system 400 suitable for determining the coupling position of the attachment, such as the attachment 100, on a given tooth, such as part of an orthodontic treatment, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 8 comprises a computer system 410. The computer system 410 may be configured, by pre-stored program instructions, to perform, based on image data associated with the subject, methods described herein for determining a coupling point of an attachment on a tooth of the subject and/or modeling the attachment on the tooth, according to certain non-limiting embodiments of the present technology and as will be described further. In some non-limiting embodiments of the present technology, the computer system 410 may further be configured to determine, based at least on the determined coupling position of the attachment and/or modeled tooth displacement, an orthodontic treatment for the subject.

In some non-limiting embodiments of the present technology, the computer system 410 is configured to receive image data pertaining to the subject before a commencement, or at a given stage, of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 (shown schematically in FIG. 8) communicatively coupled thereto. Broadly speaking the imaging device 430 may be configured (for example, by a processor 550 depicted in FIG. 9) to capture and/or process the image data of the lower teeth 16 and the periodontium (not depicted) of the subject. In certain non-limiting embodiments of the present technology, the image data may include, for example, one or more of: (1) images of external surfaces of respective crown portions (such as the tooth surface 21 of the lower teeth 16), (2) images of an external surface of the periodontium including those of the upper gingiva (not depicted), the alveolar maxillary bone (not depicted), and images of superficial blood vessels and nerve pathways associated with the lower teeth 16; and (3) images of an oral region. By doing so, the imaging device 430 may be configured, for example, to capture image data of the lower arch form 20 of the subject. In another example, the imaging device may also be configured to capture and/or process image data of an upper arch form associated with the subject without departing from the scope of the present technology. It should be noted that the image data may include two-dimensional (2D) data and/or three-dimensional data (3D).

Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling capture of direct optical impressions of the lower arch form 20 of the subject. In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold representing the arch forms of the subject. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montréal (QC), Canada, H1V 2N9. It should be expressly understood that the desktop scanner can be implemented in any other suitable equipment.

In yet other non-limiting embodiments of the present technology, the imaging device 430 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct digital 3D representations of the following regions of the subject's anatomy: dental (teeth and gum, for example); oral and maxillofacial region (mouth, jaws, and neck); and ears, nose, and throat ("ENT").

In a specific non-limiting example, the CBCT scanner can be of one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 410 may be configured for processing of the received image data. The resulting image data of the lower arch form 20 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Figure 9:
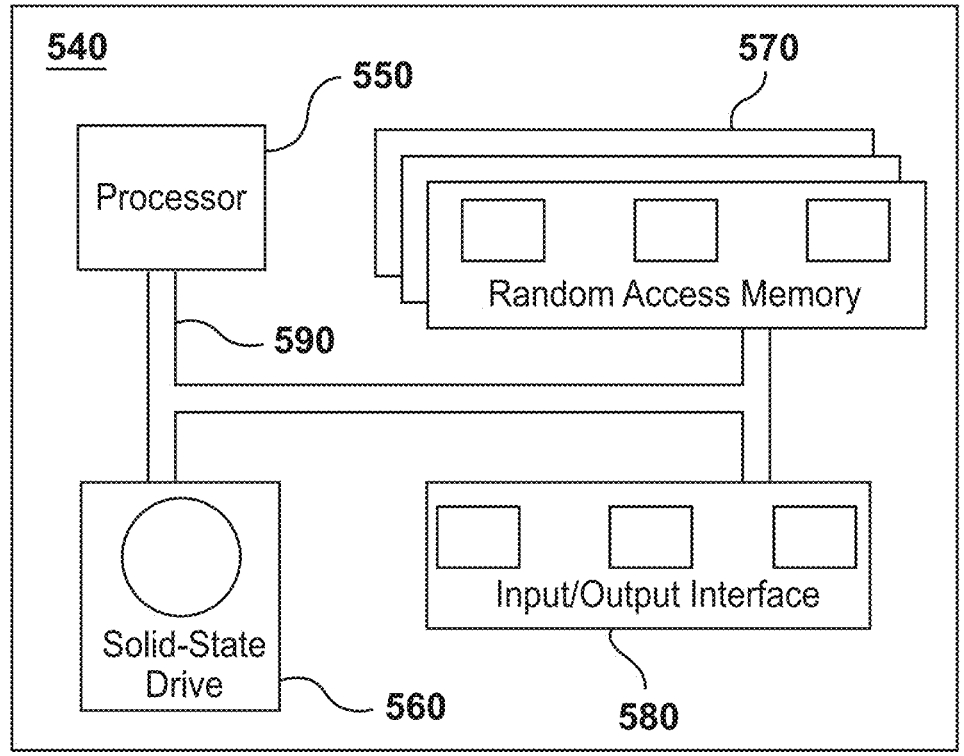
FIG. 9 depicts a schematic diagram of a computing environment of the system of FIG. 8, in accordance with certain embodiments of the present technology.

With reference to FIG. 9, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random access memory 570 and an input/output interface 580. Communication between the various components of the computing environment 540 may be enabled by one or more internal and/or external buses 590 (e.g. a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 560 stores program instructions suitable for being loaded into the random access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 8, the computer system 410 has at least one interface device 420 for providing an input or an output to a user of the system 400, the interface device 420 being in communication with the input/output interface 580. In the embodiment of FIG. 8, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 8, the interface device 420 also comprises a keyboard 424 and a mouse 426 for receiving input from the user of the system 400. Other interface devices for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As will be described in greater detail below, according to the non-limiting embodiments of the present technology, the processor 550 may be configured to: (1) receive the image data associated with the subject's teeth; and (2) based on the received image data, determine, for at least one tooth, a coupling position of the attachment on the tooth. The determined coupling position may be saved in a memory of the computing system or be output to the user of the system such as through the at least one interface device 420.

According to some non-limiting embodiments of the present technology, having received the image data, the processor 550 may be configured to generate a digital 3D model of the lower arch form 20 of the subject. Further, according to certain non-limiting embodiments of the present technology, the processor 550 may be configured to determine a model coordinate system associated with the digital 3D model.

Further, according to certain non-limiting embodiments of the present technology, the processor 550 may be configured to segment each tooth of the lower teeth 16 in the digital 3D model in order to obtain separate 3D models for each tooth. Segmentation may comprise determining a tooth-gingiva boundary, such as the gum line 22 for each tooth. The tooth-gingiva is the boundary between the crown (visible portion) of a given tooth and the surrounding gingiva. For example, in some non-limiting embodiments of the present technology, after receiving the 3D model, the processor 550 may be configured to segment thereon 3D representations of crown portions associated with the respective teeth from each other as well as from an associated gingiva, thereby generating a plurality of so segmented crown portions associated with the lower arch form 20 of the subject. In some implementations, the processor 550 may be configured to produce a mesh 600 (FIG. 10) to describe the various surfaces of the lower arch form 20. In some non-limiting implementations, the mesh 600 can then be segmented to further determine the tooth contour of each tooth. To that end, according to some non-limiting embodiments of the present technology, the processor 550 may be configured to apply one or more approaches to automatic tooth segmentation, for example, a method which is described in a co-owned U.S. Pat. No. 10,695,147, entitled "METHOD AND SYSTEM FOR DENTAL BOUNDARY DETERMINATION", issued Jun. 30, 2020; the content of which is hereby incorporated by reference herein in its entirety.

In additional non-limiting embodiments of the present technology, for a more effective determination of the coupling position of the attachment, such as the attachment 100, the processor 550 may be configured to augment the 3D model, by, for example: (1) reconstructing a digital 3D representation of a root portion of one or more teeth (for example, in those embodiments where the imaging device 430 is the intra-oral scanner used for generating the 3D model and which does not image the root portion); (2) augmenting a digital 3D representation of the crown portions of one or more teeth, further including, for example, reconstructing an accurate contour thereof; and/or (3) reconstructing an augmented digital 3D representation (not depicted) of the gingiva corresponding to actual dimensions thereof. To that end, according to certain non-limiting embodiments of the present technology, the processor 550 may be configured to apply a tooth reconstruction technique described in a co-owned U.S. patent application Ser. No. 16/936,937 filed on Jul. 23, 2020, entitled "SYSTEMS AND METHODS FOR PLANNING AN ORTHODONTIC TREATMENT", the content of which is incorporated herein by reference.

Given the architecture and the examples provided hereinabove, it is possible to execute a method for determining a coupling position of an attachment, such as the attachment 100, on a subject's tooth (such as at least one of the lower teeth 16 of the lower arch form 20). In certain embodiments, the determined coupling position of the attachment could be used to plan and/or implement an orthodontic treatment, or to model the tooth with the attachment coupled thereto. Planning the orthodontic treatment could include, for example, designing one or more of the aligners 10 including the attachment coupled to the tooth at the determined coupling position. It should be noted that the methods are described in reference to the lower arch form 20 simply as an example and could be applied to the upper arch form, mutatis mutandis.

Figure 11:
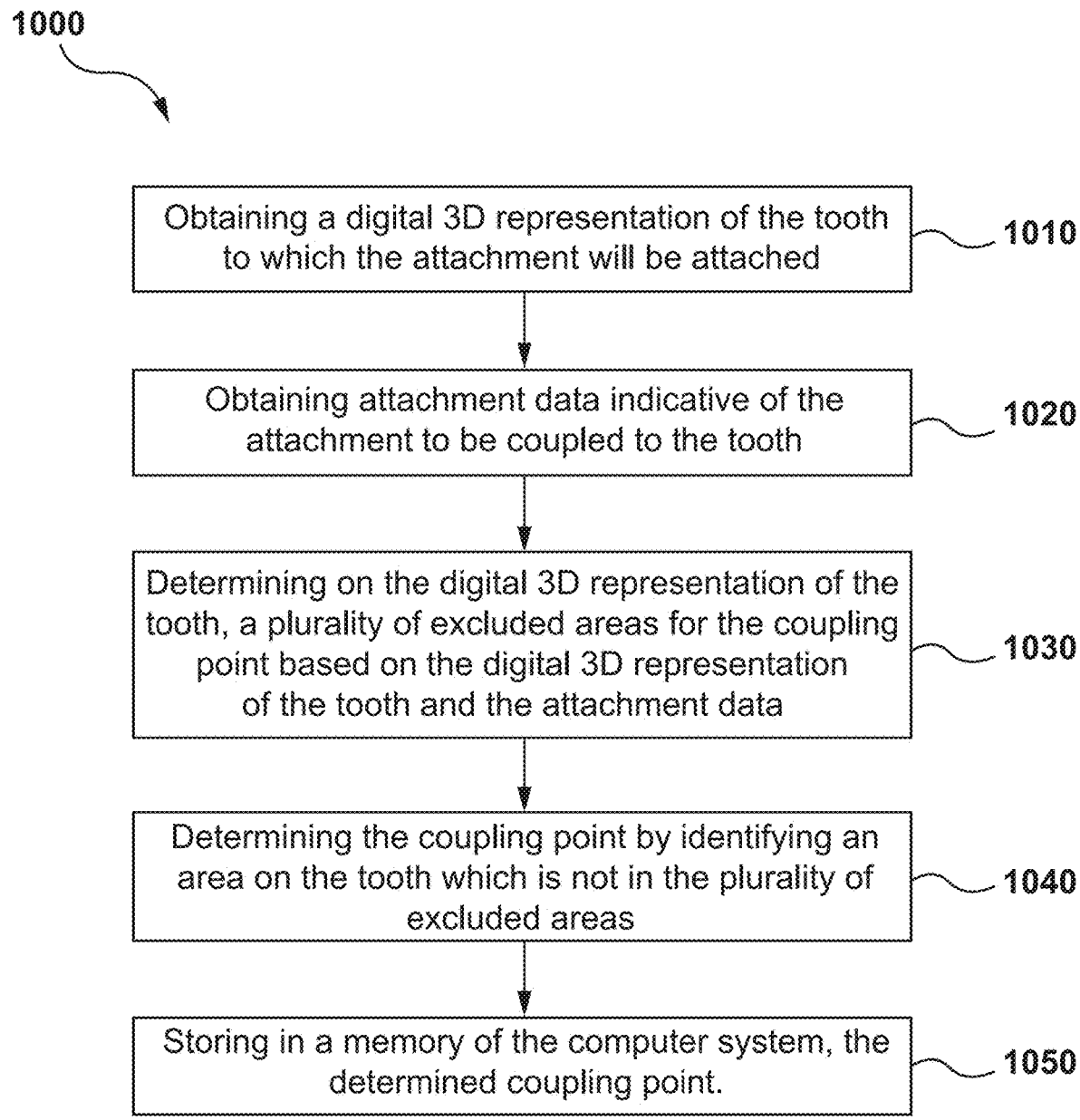
FIG. 11 depicts a flowchart of a method for determining a coupling point for an attachment to a tooth of a subject, in accordance with certain embodiments of the present technology.

With reference to FIG. 11, there is depicted a flowchart of the method 1000, according to certain non-limiting embodiments of the present technology. The method 1000 can be executed by a processor of a computing environment, such as the processor 550 of the computing environment 540. The method 1000 is described below with reference to the first tooth 11 of the lower teeth 16 for simplicity, but it is contemplated that the method 1000 could be utilized for other teeth, such as one or more teeth of the lower arch form, and/or one or more teeth of the upper arch form.

Step 1010: Obtaining a Digital 3D Representation of the Tooth to which the Attachment Will be Coupled The method 1000 commences, at step 1010, with the processor 550 obtaining a digital 3D representation of a tooth, such as the first tooth 11, to which the attachment, such as the attachment 100, will be coupled. In certain embodiments, the digital 3D representation comprises a grid mesh such as the mesh 600 illustrated in FIG. 10. The digital 3D representation may be obtained from image data associated with the subject. The mesh may comprise a digital 3D representation of the tooth surface 21 of the lower teeth 16 and the surrounding gingiva 18. In some cases, in certain non-limiting embodiments of the present technology, the processor 550 may be configured to generate the digital 3D representation of the first tooth 11, or the lower teeth of the lower arch form 20 of the subject using the image data. In some cases, the mesh could be determined prior to commencing the method 1000. In such an implementation, the mesh could then be obtained by the processor 550, for instance, by retrieving the mesh from a readable storage device (not shown) communicatively coupled to the processor 550.

In some implementations of the method 1000, obtaining the mesh includes receiving a scan of the tooth of the patient to create the image data of the tooth. Depending on the particular implementation, receiving the scan of the tooth could include imaging the lower arch form 20 or retrieving the scan from a readable storage device or the imaging device 430. Having received the scan, the processor 550 could then create the digital 3D representation of the first tooth 11 from the image data.

In certain embodiments, prior to step 1010, the method 1000 comprises segmenting the digital 3D representation of the first tooth 11 from a digital 3D representation of a plurality of teeth including the given tooth. According to some non-limiting implementations, segmenting the digital 3D representation comprises identifying one or both of: a tooth-gingiva boundary 610 of the given tooth and surrounding gingiva (e.g. the gum line 22), and a boundary of the tooth and an adjacent tooth.

Figure 10:
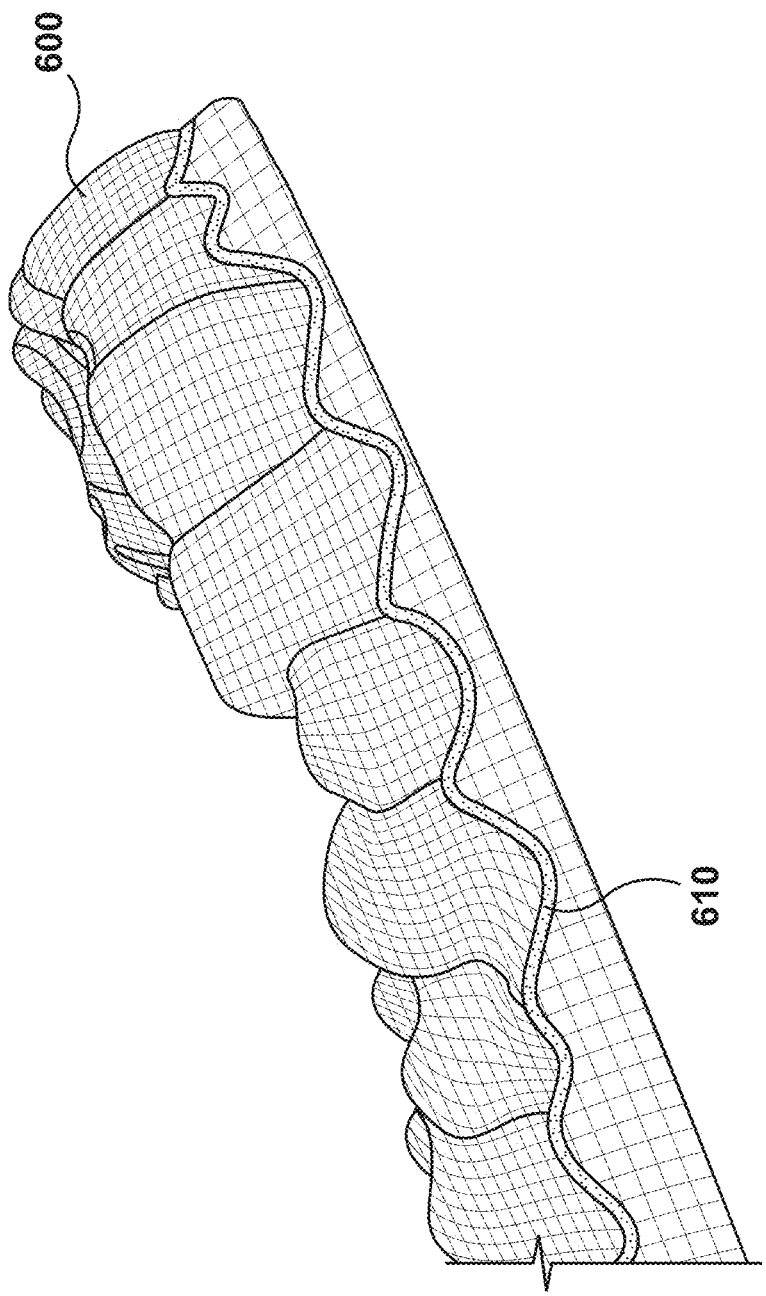
FIG. 10 depicts a digital 3D representation of the lower arch form of FIG. 1, with a tooth-gum boundary identified, in accordance with certain embodiments of the present technology.

The determination of the tooth-gingiva boundary 610 could be performed according to one or more methods proposed by the co-owned Patent '147. For example, the method may comprise: receiving the digital 3D representation of the teeth and the surrounding gingiva of the patient and the defining, for each tooth, a plurality of curves crossing a boundary between the tooth and the surrounding gingiva around a perimeter of each tooth. Then the method 1000 could continue with determining, for each point of each curve, an indication of curvature and determining, for each point and based on the indication of curvature, a predicted likelihood parameter that each point corresponds to the tooth-gingiva boundary 610 between the teeth and the surrounding gingiva. The tooth-gingiva boundary 610 could then be determined by selecting one point of each curve, using a smoothing function and the predicted likelihood parameter, as a boundary point corresponding to the tooth-gingiva boundary 610 between the teeth and the surrounding gingiva. The boundary points surrounding each tooth would thus form the tooth-gingiva boundary 610 of each tooth (FIG. 10).

As is mentioned briefly above, the tooth-gingiva boundary 610 is the border between a visible portion of each tooth (i.e. the crown) and the surrounding gingiva. In some implementations, the tooth-gingiva boundary of each tooth or an arch form could be determined prior to commencement of the method 1000. For example, the tooth-gingiva boundary could be determined and stored, such as with the scan of the teeth, and then subsequently retrieved from the readable storage device.

In some implementations of the method 1000, obtaining the tooth-gingiva boundary 610 of each tooth includes determining tooth-gingiva boundary 610 by the processor 550, such as in the manner described above with reference to the '147 patent.

Step 1020: Obtaining Attachment Data Indicative of the Attachment to be Coupled to the Tooth At step 1020, the method 1000 comprises obtaining attachment data indicative of the attachment, such as the attachment 100, to be coupled to the tooth. The attachment data may be in any format. For example, in certain implementations, the attachment data is a digital 3D representation of the attachment or a portion thereof, and may comprise a mesh representative of a surface of the attachment. In certain implementations, the attachment data may comprise information about the attachment such as dimensions of the attachment (e.g. a height, a diameter, etc.).

The attachment data may be obtained from a memory, such as the random access memory 570 of the computer system 410.

In other embodiments, the attachment data may be obtained from an imaging device, such as the imaging device 430.

Step 1020 may be performed before or after step 1010, or simultaneously.

Step 1030: Determining, on the Digital 3D Representation of the Tooth, a Plurality of Excluded Areas for the Coupling Point Based on the Digital 3D Representation of the Arch Form and the Attachment Data The method 1000 then continues, at step 1030, by determining, on the digital 3D representation of the tooth, one or more excluded areas for the coupling point of the attachment, such as the coupling point 101 for the attachment 100.

This may be determined based on predetermined criteria defining the plurality of excluded areas.

Example excluded areas comprise one or more of:

(i) a first excluded area, within which if the attachment were to be coupled to the tooth, there would be contact between the attachment and one or more teeth of an opposite arch form;

(ii) a second excluded area, within which if the attachment were to be coupled to the tooth, there would be contact between the attachment and one or more neighbouring teeth of the same arch form;

(iii) a third excluded area on a lingual surface of the given tooth, (iv) a fourth excluded area on a front surface (e.g. buccal or labial) of the given tooth, (v) a fifth excluded area which is within a predetermined distance of a gum line of the given tooth, and (vi) a sixth excluded area which is within a predetermined distance of an edge of an appliance, such as the edge 32 of the aligner 10.

(vii) a seventh excluded area which is defined to take into account verticality.

The processor, such as the processor 550, may cause one or more of the excluded areas, such as the first excluded area, the second excluded area, the third excluded area, the fourth excluded area, the fifth excluded area, the sixth excluded area, and the seventh excluded area to be displayed as a heat map on the digital 3D representation of the tooth. In this respect, one or more of the excluded areas may be defined as gradients indicating an extent of the restriction. Determination of the excluded areas, according to embodiments of the present technology, are described below with reference to FIGS. 12-20.

First Excluded Area

Figure 12:
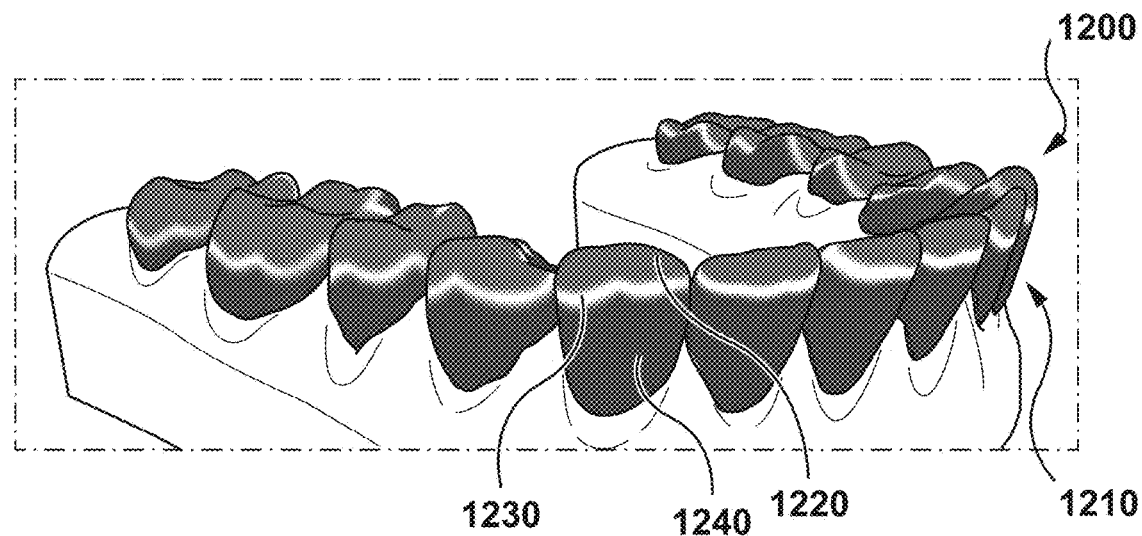
FIG. 12 depicts a digital 3D representation of the lower arch form of FIG. 1, with a first excluded area indicated thereon as a heat map, in accordance with certain embodiments of the present technology.

With reference to FIG. 12, there is shown a digital 3D representation 1200 of the lower teeth 16 of the lower arch form 20 with the first excluded area 1210 marked thereon as a heat map. As stated above, the first excluded area 1210 is defined so as to ensure that the attachment when positioned on a given tooth of the given arch form, such as the first tooth 11 of the lower arch form 20) does not collide with teeth of the opposite arch form. The heat map comprises bands representative of degrees of relevance, including, for example, a first band 1220, a second band 1230 and a third band 1240. The first band 1220 may indicate a region of most relevance in terms of level of exclusion i.e. higher chance of a given tooth of the lower arch form 20 colliding with a tooth of the opposite arch form. The first band 1220 may have a red color, for example. The third band 1240, indicates a region of least relevance in terms of level of exclusion i.e. less chance of a given tooth of the lower arch form 20 colliding with a tooth of the opposite arch form. The third band 1240 may have a green color, for example. The second band 1230 indicates a region of medium relevance in terms of level of exclusion i.e. medium chance of a given tooth of the lower arch form 20 colliding with a tooth of the opposite arch form. The second band 1230 may have a yellow color, for example.

Generally, the first excluded area 1210 may be determined based on one or more predetermined distances between a point on the digital 3D representation 1200 of the given tooth (i.e. a surface thereof) with a closest point on a surface of a tooth of the opposite arch form. The one or more predetermined distances may take into account a dimension of the attachment, and/or a dimension, such as thickness, of the aligner.

More specifically, the first band 1220 may be determined based on a first predetermined distance from a closest point on a surface of a tooth of the opposite arch form. An example first predetermined distance corresponds to a thickness of the aligner 10 plus a maximum height of the attachment 100.

The second band 1230 may be determined based on a second predetermined distance from a closest point on a surface of a tooth of the opposite arch form, the second predetermined distance being greater than the first predetermined distance. An example second predetermined distance may be between about 0.2 and 0.3 mm. In certain cases, the second band 1230 may be designated as a permissible area for the coupling point of the attachment 100.

The third band 1240 may be determined based on a third predetermined distance from a closest point on a surface of a tooth of the opposite arch form, the third predetermined distance being greater than the second predetermined distance. The third band 1240 may be determined as any area on the given tooth which is not in the first and second bands 1220, 1230.

In this regard, the method 1000 may comprise, the processor 550, determining the first excluded area 1210 for the given tooth by, for each location on the digital 3D representation 1200 of the given tooth, determining whether a distance from the location to a closest point of a surface of a tooth on an opposite arch form is within a predetermined distance, and if so, indicating that the given location is in the first excluded area. The location may comprise a point or a vertex of the digital 3D representation 1200 of the given tooth.

More specifically, when the first excluded area 1210 comprises a plurality of bands of relevance, the method 1000 comprises, determining the plurality of bands of relevance of the first excluded area 1210 by determining distances of points on the digital 3D representation 1200 of the given tooth from closest points of teeth on the opposing arch form, and identifying whether a given point on the given tooth is within a given band based on a predetermined distance associated with the given band.

It will be appreciated that the inclusion of different numbers of bands than the three illustrated in FIG. 12 is within the scope of the present technology. By points is meant a vertex of the digital 3D representation 1200, in certain embodiments.

In certain embodiments, the method 1000 comprises obtaining the predetermined distance, a digital 3D representation of the opposite arch form, the 3D representation of the tooth. The 3D representation of the opposite arch form may comprise a mesh. The determination of the first excluded area 1210 may be based on one or more predetermined relative positions of the lower and upper arch forms. The one or more predetermined relative positions may include a bite configuration, and/or relative positions such as during an activity such as talking, eating, etc.

Second Excluded Area

Figure 13:
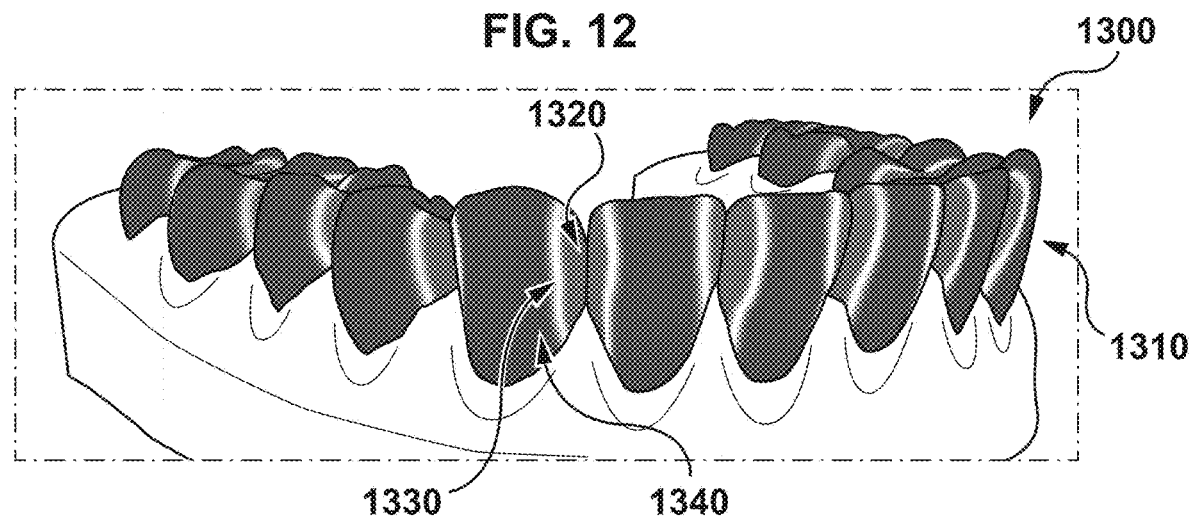
FIG. 13 depicts a digital 3D representation of the lower arch form of FIG. 1, with a second excluded area indicated thereon as a heat map, in accordance with certain embodiments of the present technology.

With reference to FIG. 13, there is shown a digital 3D representation 1300 of the lower teeth 16 of the lower arch form 20 with the second excluded area 1310 marked thereon as a heat map. As stated above, the second excluded area 1310 is defined so as to ensure that the attachment when positioned on a given tooth of the given arch form does not collide with one or more neighbouring teeth of the same arch form. The heat map comprises bands representative of a degree of relevance, including, for example, a first band 1320, a second band 1330 and a third band 1340. The first band 1320 indicates a region of most relevance in terms of level of exclusion i.e. higher chance of a given tooth of the lower arch form 20 colliding with one or more neighbouring teeth of the same arch form. The first band 1320 may have a red color, for example. The third band 1340, indicates a region of least relevance in terms of level of exclusion i.e. less chance of a given tooth of the lower arch form 20 colliding with one or more neighbouring teeth of the same arch form. The third band 1340 may have a green color, for example. The second band 1330 indicates a region of medium relevance in terms of level of exclusion i.e. medium chance of a given tooth of the lower arch form 20 colliding with one or more neighbouring teeth of the same arch form. The second band 1330 may have a yellow color, for example.

Generally, the second excluded area 1310 may be determined based on one or more predetermined distances between a point on the digital 3D representation 1300 of the given tooth (i.e. a surface thereof) with a closest point on a surface of one or more neighbouring teeth of the same arch form. For different locations on the given tooth, the second excluded area 1310 may be determined based on a distance from a closest point on the neighboring tooth being within the one or more predetermined distances from the determined closest point of the neighboring tooth More specifically, the first band 1320 may be determined based on a first predetermined distance from a closest point on a surface of the neighboring tooth. The first predetermined distance may correspond with a maximum height of the attachment 100.

The second band 1330 may be determined based on a second predetermined distance from a closest point on the surface of the neighboring tooth, the second predetermined distance being greater than the first predetermined distance. An example second predetermined distance is between about 0.2 and about 0.3 mm.

The third band 1340 may be determined based on a third predetermined distance from a closest point on a surface of the neighboring tooth, the third predetermined distance being greater than the second predetermined distance.

In this regard, the method 1000 may comprise, the processor 550, determining the second excluded area 1310 for the given tooth on the given arch form by, for each location on the digital 3D representation 1300 of the given tooth, determining whether a distance from the location to a closest point of the neighbouring tooth on an opposite arch form is within a predetermined distance, and if so, indicating that the given location is in the first excluded area. The location may comprise a point or a vertex of the digital 3D representation, which may comprise a mesh.

More specifically, when the first excluded area 1310 comprises a plurality of bands of relevance, the method 1000 comprises, determining the plurality of bands of relevance of the first excluded area 1310 by determining distances of points on the digital 3D representation 1300 of the given tooth from closest points of teeth on the opposing arch form, and identifying whether a given point on the given tooth is within a given band based on a predetermined distance associated with the given band.

It will be appreciated that the inclusion of different numbers of bands than the three illustrated in FIG. 13 is within the scope of the present technology.

In certain embodiments, the method 1000 comprises obtaining the predetermined distance, a digital 3D representation of the neighbouring tooth. The digital 3D representation of the tooth and the digital 3D representation of the neighbouring tooth may comprise a mesh.

Third Excluded Area

Figure 14:
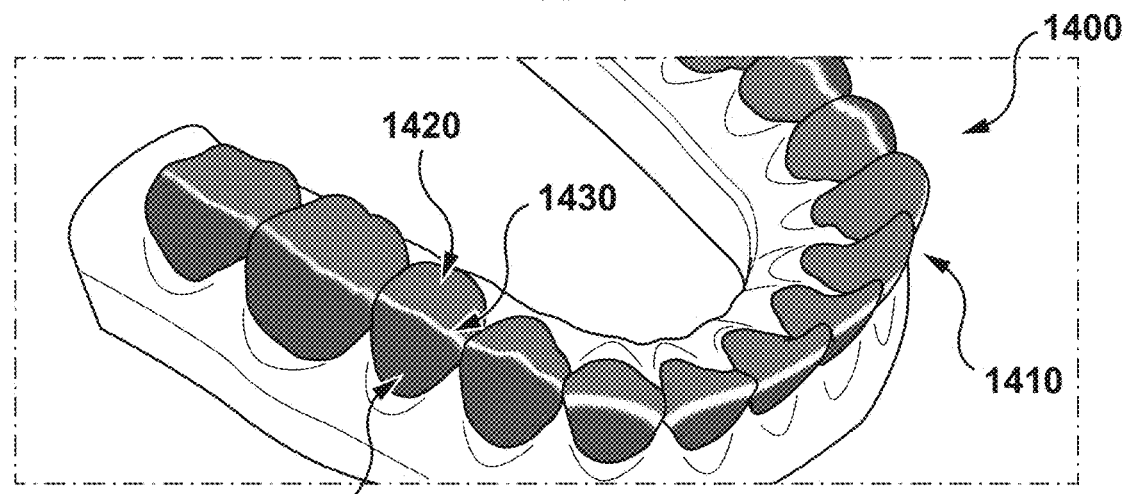
FIG. 14 depicts a digital 3D representation of the lower arch form of FIG. 1, with a third excluded area indicated thereon as a heat map, in accordance with certain embodiments of the present technology.

With reference to FIG. 14, there is shown a digital 3D representation 1400 of the lower teeth 16 of the lower arch form 20 with the third excluded area 1410 marked thereon as a heat map. As stated above, the third excluded area 1410 is defined so as to ensure that the attachment is positioned on a front (buccal or labial) surface of the given tooth. In other words, the third excluded area 1410 can be considered as those areas of the given tooth which are not on the front surface (front side) of the given tooth. The heat map comprises bands representative of a degree of relevance, including, for example, a first band 1420, a second band 1430 and a third band 1440. The first band 1420 indicates a region of most relevance in terms of level of exclusion i.e. higher chance that the area is not the front side of the given tooth. The first band 1420 may have a red color, for example. The third band 1440, indicates a region of least relevance in terms of level of exclusion i.e. more chance that the area is on the front side of the given tooth. The third band 1440 may have a green color, for example. The second band 1430 indicates a region of medium relevance in terms of level of exclusion i.e. medium chance of the area being on the front side of the given tooth. The second band 1430 may have a yellow color, for example.

Generally, the third excluded area 1410 may be determined based on determining a distal-mesial plane extending through a tooth axis of the given tooth; and determining one of either a lingual side or a vestibular side of the distal-mesial plane on the given tooth as the third excluded area.

Figure 15:
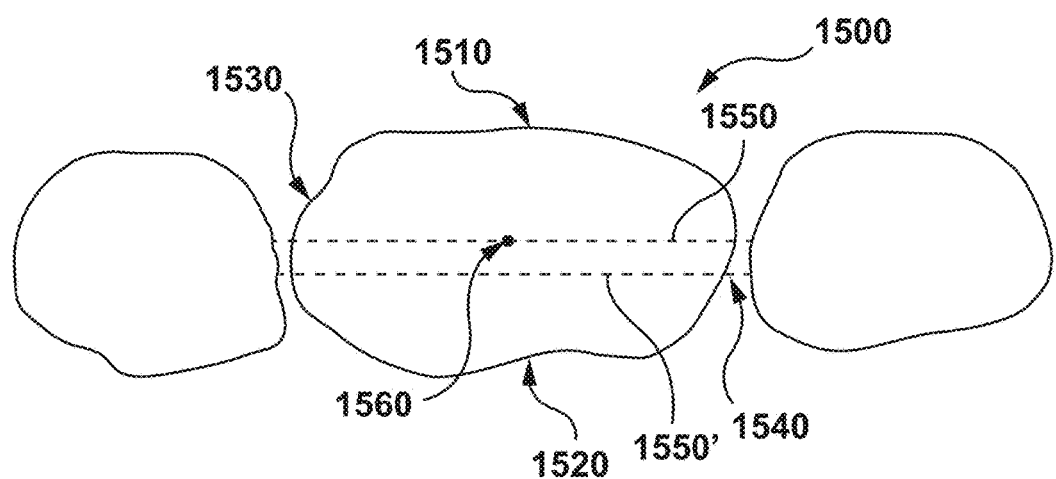
FIG. 15 is a top plan view of some of the teeth of FIG. 14 indicating a tooth axis, in accordance with certain embodiments of the present technology.

Referring to FIG. 15, there is indicated a digital 3D representation 1500 of the first tooth 11 viewed from an occlusal surface (i.e. a top plan view) and showing a lingual side 1510, a vestibular (buccal/labial) side 1520, a distal side 1530 and a mesial side 1540 of the first tooth 11. The distal-mesial plane 1550 is indicated as passing through the tooth axis 1560 which is positioned substantially centrally of the first tooth 11, although this may not necessarily be the case.

In certain embodiments, the distal-mesial plane 1550 may be displaced by a predetermined displacement distance towards either the buccal/labial side 1520 or the lingual side 1510 to define a displaced distal-mesial-plane 1550', and the displaced distal-mesial-plane 1550' is used to define the third excluded area 1410.

In certain embodiments, the third excluded area 1410 is taken as all surfaces of the given tooth other than the portion on the buccal/labial side 1520 of the given tooth of the determined distal-mesial-plane 1550 or the displaced distal-mesial-plane 1550'. Put another way, the third excluded area 1410 is taken as all surfaces of the given tooth on the lingual side 1510 of the determined distal-mesial-plane 1550 or the displaced distal-mesial-plane 1550'. In certain other embodiments, the third excluded area 1410 is taken as all surfaces of the given tooth other than the portion on the lingual side 1510 of the given tooth of the determined distal-mesial-plane 1550 or the displaced distal-mesial-plane 1550'. Put another way, the third excluded area 1410 is taken as all surfaces of the given tooth on the vestibular side 1520 of the determined distal-mesial-plane 1550 or the displaced distal-mesial-plane 1550'.

The distal-mesial plane 1550 may be determined by identifying a distal point on the distal side 1530 of the given tooth and a mesial point on the mesial side 1540 of the given tooth. The tooth axis 1560 may be determined by any suitable method.

In this regard, the method 1000 may comprise, the processor 550, determining the third excluded area 1410 for the given tooth on the given arch form by determining the distal-mesial plane based on the tooth axis 1560 of the given tooth, and determining the third excluded area 1410 as being a portion of the given tooth which is on the lingual side 1510 of the distal-mesial plane. The method may further comprise displacing the distal-mesial plane by a predetermined distance in a direction of either the lingual or the buccal/labial sides to define the displaced distal-mesial plane, and determining the third excluded area 1410 as being a portion of the given tooth which is on the lingual side of the displaced distal-mesial plane.

In embodiments in which the third excluded area 1410 is indicated as a heat map, the first band 1420 may be determined based on a first predetermined distance from the distal-mesial plane 1550 or the displaced distal-mesial plane 1550'. The second band 1430 may be determined based on a second predetermined distance from the distal-mesial plane 1550 or the displaced distal-mesial plane 1550', the second predetermined distance being greater than the first predetermined distance. An example second predetermined distance is xxx mm. (NTD: please provide). The third band 1440 may be determined based on a third predetermined distance from the distal-mesial plane 1550 or the displaced distal-mesial plane 1550', the third predetermined distance being greater than the second predetermined distance.

In this regard, the method 1000 may comprise, determining the plurality of bands of relevance of the third excluded area 1410 by, for each location on the given tooth, determining a distance from the distal-mesial plane 1550 or the displaced distal-mesial plane 1550', and identifying whether the given location is within a certain band of relevance based on a predetermined distance range associated with the given band.

It will be appreciated that the inclusion of different numbers of bands than the three illustrated in FIG. 14 is within the scope of the present technology.

In certain embodiments, the method 1000 comprises obtaining the predetermined distances. In certain embodiments, the method 1000 may further comprise determining the tooth axis 1560.

The tooth axis 1560 may be determined in any suitable manner, one example of which is described in U.S. Pat. No. 10,856,954, entitled "SYSTEMS AND METHODS FOR DETERMINING TOOTH CENTER OF RESISTANCE" issued 8 Dec. 2020, the content of which is hereby incorporated by reference herein in its entirety.

More specifically, the tooth axis 120 of, for example, the first tooth 11 may be determined by, the processor, such as the processor 550 executing a method comprising: receiving image data of a crown portion of the first tooth 11, the image data comprising a mesh representative of a surface of the first tooth 11; identifying an internal reference point in the image data, the internal reference point being a mesiodistal center of the tooth crown, the identifying the internal reference point comprising: obtaining a mesial point on the mesial side, such as the mesial side 1540, of the tooth crown, and a distal point on a distal side, such as the distal side 1530, of the tooth crown; generating a mesiodistal line joining the mesial point and the distal point; identifying the mesiodistal center as a midpoint on the mesiodistal line; determining a reference plane in the image data, the reference plane being perpendicular to the mesiodistal line and extending through the mesiodistal center; determining an intersection curve based on an intersection of the reference plane and the crown portion, the intersection curve following a shape of the surface of the crown portion at the reference plane; and determining the tooth axis 1560 of the first tooth 11 based on the intersection curve.

Fourth Excluded Area

Figure 16:
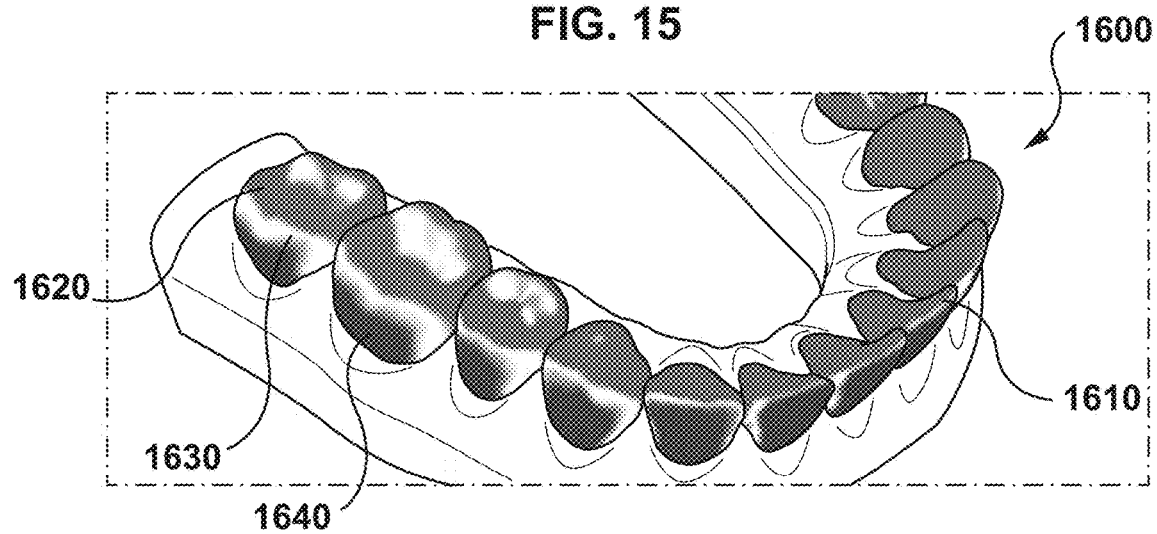
FIG. 16 depicts a digital 3D representation of the lower arch form of FIG. 1, with a fourth excluded area indicated thereon as a heat map, in accordance with certain embodiments of the present technology.

With reference to FIG. 16, there is shown a digital 3D representation 1600 of the lower teeth 16 of the lower arch form 20 with the fourth excluded area 1610 marked thereon as a heat map. As stated above, the fourth excluded area 1610 is defined so as to ensure that the attachment is not positioned on inappropriately angled surfaces of the front (buccal/labial) surface of the given tooth. The heat map comprises bands representative of a degree of relevance, including, for example, a first band 1620, a second band 1630 and a third band 1640. The first band 1620 indicates a region of most relevance in terms of level of exclusion i.e. the surface is highly inappropriate for coupling the attachment 100. The first band 1620 may have a red color, for example. The third band 1640, indicates a region of least relevance in terms of level of exclusion i.e. most appropriately angled surface for coupling the attachment. The third band 1640 may have a green color, for example. The second band 1630 indicates a region of medium relevance in terms of level of exclusion. The second band 1630 may have a yellow color, for example.

Generally, the fourth excluded area 1610 is based on an angle of a parameter associated with the front surface of the given tooth and a reference plane or line, being within a predetermined angle. The parameter associated with the front surface of the given tooth may be based on a normal axis of a vector of the mesh of the given tooth. The reference plane may comprise a Z axis of a lingual-buccal/labial plane. The lingual-buccal/labial plane may be determined from mesiodistal line that extends from mesial point on a mesial side of the given tooth to a distal point on a distal side of the given tooth which defines a mesiodistal center point. Projecting along a Y axis to the surface of the tooth defines a surface point. The lingual-buccal/labial plane extends through the surface point, and is displaced along its Z axis to define the reference plane.

In this regard, the method 1000 may comprise, the processor 550, determining, for each vector of the given tooth on the given arch form, an angle between (i) a normal axis of the vector of the mesh of the given tooth, and (ii) a reference plane or line associated with the given tooth. If the determined angle is outside of a predetermined angle, that given vector is considered to be part of the fourth excluded area. The fourth excluded area 1610 may be combined with the third excluded area 1410 to ensure that surfaces of the given tooth other than the front surface are excluded.

In embodiments in which the fourth excluded area 1610 is indicated as a heat map, the first band 1620 may be determined based on a first predetermined angle difference. The second band 1630 may be determined based on a second predetermined angle difference, the second predetermined angle difference being less than the first predetermined angle difference. The third band 1640 may be determined based on a third predetermined angle difference, the third predetermined distance being less than the second predetermined distance. One or more of the first predetermined angle difference, the second predetermined angle difference, and the third predetermined angle difference may be based on a normal distribution.

In this regard, the method 1000 may comprise, determining the plurality of bands of relevance of the fourth excluded area 1610 by, for each location on the given tooth, determining an angle difference of a normal axis of the location with the reference plane or line, and identifying whether the given location is within a certain band of relevance based on a predetermined angle range associated with the given band.

It will be appreciated that the inclusion of different numbers of bands than the three illustrated in FIG. 16 is within the scope of the present technology.

Fifth Excluded Area

Figure 17:
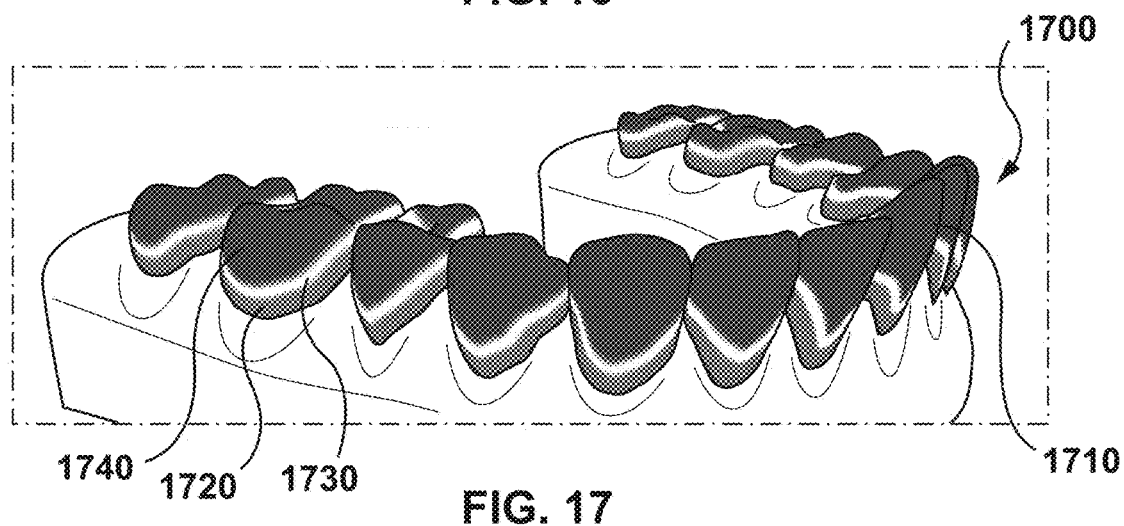
FIG. 17 depicts a digital 3D representation of the lower arch form of FIG. 1, with a fifth excluded area indicated thereon as a heat map, in accordance with certain embodiments of the present technology.

With reference to FIG. 17, there is shown a digital 3D representation 1700 of the lower teeth 16 of the lower arch form 20 with the fifth excluded area 1710 marked thereon as a heat map. As stated above, the fifth excluded area 1710 is defined so as to ensure that the attachment when coupled to the tooth does not interfere or otherwise touch the gum of the subject. The fifth excluded area 1710 is defined by a predetermined distance from a gum lime of the subject, such as the gum line 22 or the gum line 610 of the lower arch form 20. The heat map comprises bands representative of a degree of relevance, including, for example, a first band 1720, a second band 1730 and a third band 1740. The first band 1720 indicates a region of most relevance in terms of level of exclusion i.e. the area is closer to the gum line. The first band 1720 may have a red color, for example. The third band 1740, indicates a region of least relevance in terms of level of exclusion i.e. the area is further from the gum line. The third band 1740 may have a green color, for example. The second band 1730 indicates a region of medium relevance in terms of level of exclusion. The second band 1430 may have a yellow color, for example.

Generally, the fifth excluded area 1710 may be determined by obtaining the gum line associated with the given tooth in the arch form, and determining, for each vector of the given tooth, a distance from the gum line. If the distance is within the predetermined distance of the fifth excluded area, it is determined that the vector is in the fifth excluded area. Alternatively, the gum line can be displaced towards the occlusal surface of the given tooth by a predetermined surface, and the area between the displaced gum line and the gum line is identified as the fifth excluded area 1710.

In this regard, the method 1000 may comprise, the processor 550, determining the fifth excluded area 1710 for the given tooth on the given arch form by obtaining the gum line associated with the given tooth in the arch form, and determining, for each vector of the given tooth, a distance from the gum line. If the distance is within the predetermined distance of the fifth excluded area, it is determined that the vector is in the fifth excluded area. Alternatively, the method 1000 may comprise, the processor 550, determining the fifth excluded area 1710 for the given tooth on the given arch form by obtaining a gum line associated with the given tooth in the arch form, and displacing the gum line towards the occlusal surface of the given tooth by a predetermined surface, and determining the area between the displaced gum line and the gum line as the fifth excluded area 1710.

In embodiments in which the fifth excluded area 1710 is indicated as a heat map, the first band 1720 may be determined based on a first predetermined distance from the gum line. An example of the first predetermined distance is between about 1 and about 3 mm. The second band 1730 may be determined based on a second predetermined distance from the gum line, the second predetermined distance being greater than the first predetermined distance. An example second predetermined distance is between about 2 and about 5 mm. The third band 1740 may be determined based on a third predetermined distance from the gum line, the third predetermined distance being greater than the second predetermined distance. The third band 1740 may be determined based on all areas not including the first and second bands 1720, 1730.

In this regard, the method 1000 may comprise, determining the plurality of bands of relevance of the fifth excluded area 1710 by, for each location on a given tooth, by determining a distance of the location from the gum line, and identifying whether the given location is within a certain band of relevance based on a predetermined distance range associated with the given band.

It will be appreciated that the inclusion of different numbers of bands than the three illustrated in FIG. 17 is within the scope of the present technology.

In certain embodiments, the method 1000 comprises obtaining the predetermined distances. In certain embodiments, the method 1000 may further comprise determining the gum line according to the methods and systems described in U.S. Pat. No. 10,695,147 which is incorporated herein by reference.

Sixth Excluded Area

The sixth excluded area differs from the fifth excluded area in that instead of gum line of the subject's teeth, the method 1000 takes into account an edge of the aligner to be worn over the teeth, such as the edge 32 of the aligner 10. The edge of the aligner may have been determined in any manner. The method 1000 may further comprise obtaining data about the edge 32 of the aligner 10, or otherwise determining the edge 32 of the aligner 10.

Seventh Excluded Area

Figure 18:
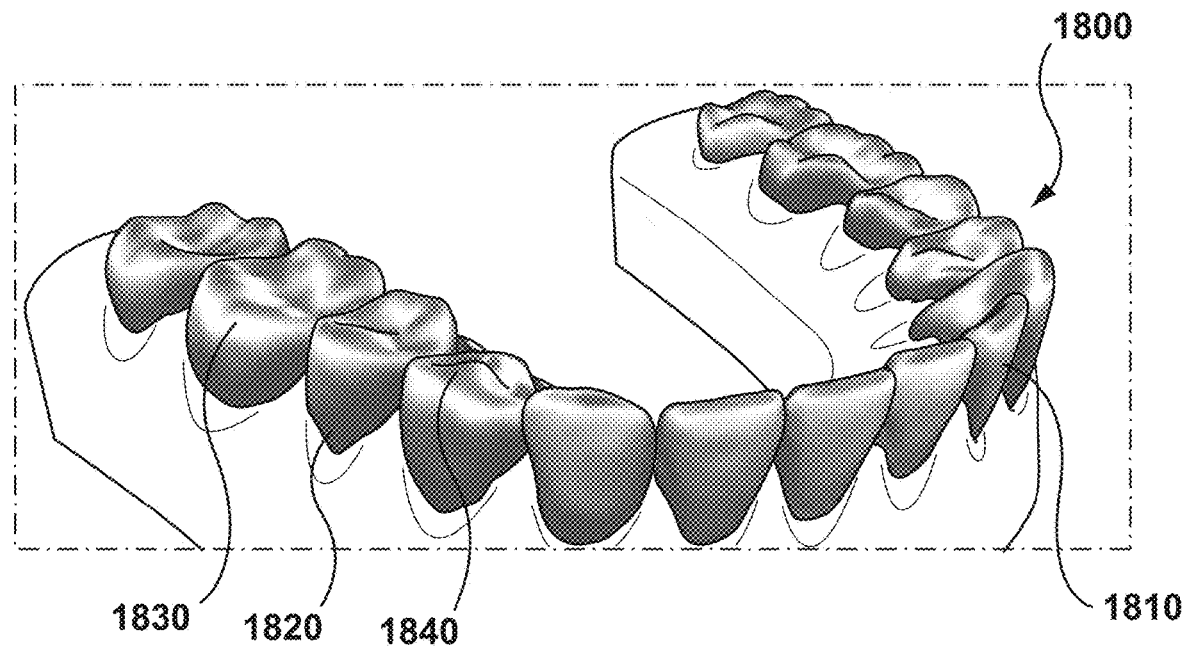
FIG. 18 depicts a digital 3D representation of the lower arch form of FIG. 1, with a sixth excluded area indicated thereon as a heat map, in accordance with certain embodiments of the present technology.

With reference to FIG. 18, there is shown a digital 3D representation 1800 of the lower teeth 16 of the lower arch form 20 with the seventh excluded area 1810 marked thereon as a heat map. The seventh excluded area 1810 is defined so as to take into account verticality. Generally, the seventh excluded area 1810 is based on a desired 90° angle between a normal axis of a vector on the mesh and the tooth axis of the given tooth. The heat map comprises bands representative of a degree of relevance, including, for example, a first band 1820, a second band 1830 and a third band 1840. The first band 1820 indicates a region of most relevance in terms of level of exclusion i.e. the angle between the normal axis and the tooth axis is less than 90° by a relatively large amount. The first band 1820 may have a red color, for example. The third band 1840, indicates a region of least relevance in terms of level of exclusion i.e. the angle between the normal axis and the tooth axis is less than 90° by a relatively small amount. The third band 1840 may have a green color, for example. The second band 1830 indicates a region of medium relevance in terms of level of exclusion. The second band 1830 may have a yellow color, for example.

In this regard, the method 1000 may comprise, the processor 550, determining, for each vector of the given tooth on the given arch form, an angle between (i) a normal axis of the vector of the mesh of the given tooth, and (ii) a tooth axis of the given tooth. If the determined angle is outside of a predetermined angle, such as 90°, that given vector is considered to be part of the seventh excluded area. The tooth axis may be determined in any manner. In certain embodiments, the tooth axis may be determined as described in U.S. Pat. No. 10,856,954.

In embodiments in which the seventh excluded area 1810 is indicated as a heat map, the first band 1820 may be determined based on a first predetermined angle difference. The second band 1830 may be determined based on a second predetermined angle difference, the second predetermined angle difference being less than the first predetermined angle difference. The third band 1840 may be determined based on a third predetermined angle difference, the third predetermined distance being less than the second predetermined distance. The first, second and third predetermined angle differences may be based on a normal distribution.

In this regard, the method 1000 may comprise, determining the plurality of bands of relevance of the seventh excluded area 1810 by, for each location on the given tooth, determining an angle difference of a normal axis of the location with the tooth axis, and identifying whether the given location is within a certain band of relevance based on a predetermined angle range associated with the given band.

It will be appreciated that the inclusion of different numbers of bands than the three illustrated in FIG. 18 is within the scope of the present technology.

In certain other embodiments, one or more additional excluding areas may be determined.

Step 1040: Determining the Coupling Point by Identifying an Area on the Tooth which is not in the Plurality of Excluded Areas In certain embodiments of the method 1000, in a step 1040, the coupling point for the attachment, such as the coupling point 101 for the attachment 100 is determined by considering one or more of the first excluded area, the second excluded area, the third excluded area, the fourth excluded area, the fifth excluded area, the sixth excluded area and the seventh excluded area, and identifying at least one area which is not in one or more of the first excluded area, the second excluded area, the third excluded area, the fourth excluded area, the fifth excluded area, the sixth excluded area and the seventh excluded area.

In certain embodiments, the processor 550 may consider, for each vector of the mesh, whether the given vector is one of the excluded areas, and identify it as such.

Figure 19:
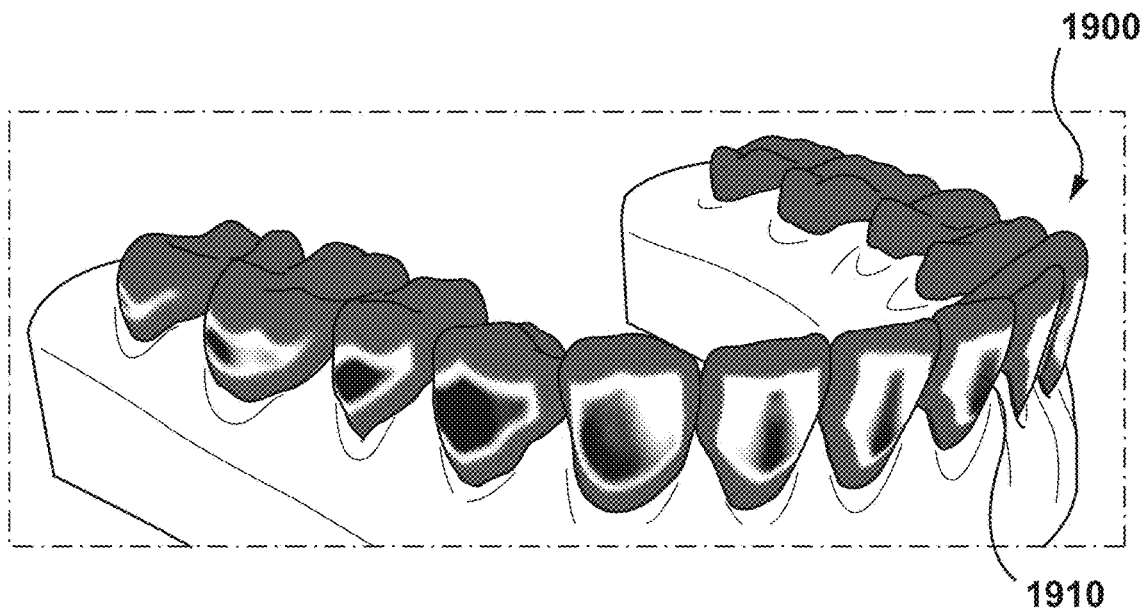
FIG. 19 depicts a digital 3D representation of the lower arch form of FIG. 1, with a combined single heat map of all excluded areas from FIGS. 12-18 combined, in accordance with certain embodiments of the present technology.
Figure 20:
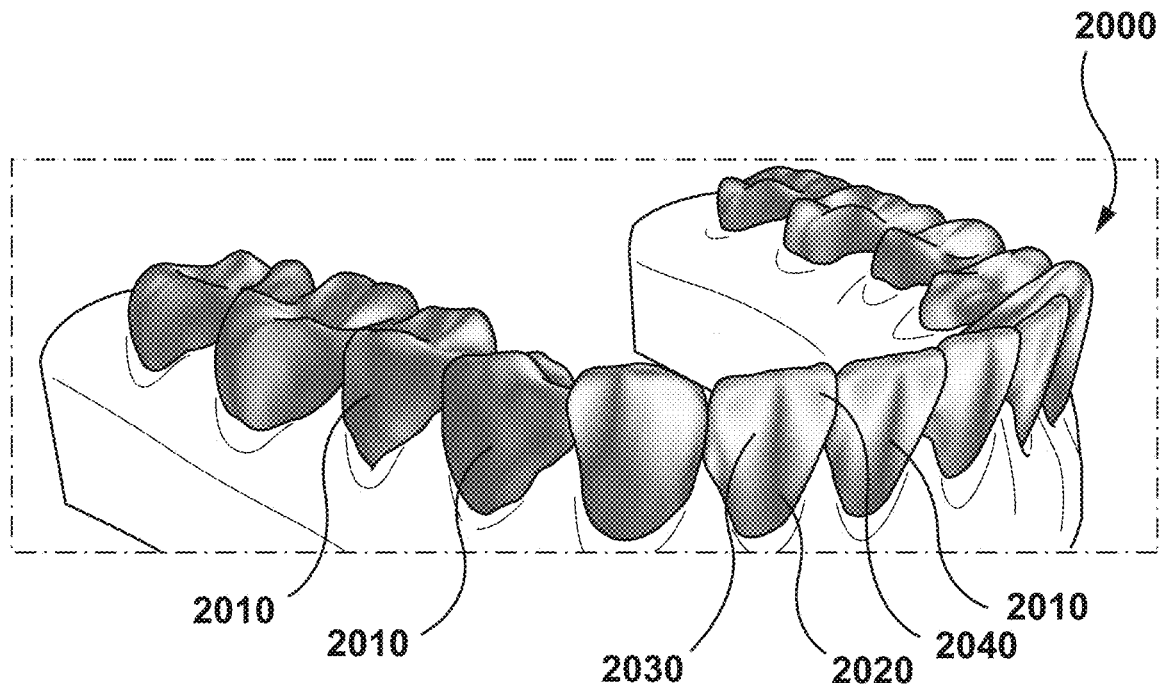
FIG. 20 depicts a digital 3D representation of the lower arch form of FIG. 1, with a heat map of an optimal area, in accordance with certain embodiments of the present technology.

In certain embodiments, the processor may, in step 1040, combine all the heat maps of of all the determined excluded areas, and normalize the heatmaps and combine them into a single combined heat map 1900 (FIG. 19). In certain other embodiments, the method 1000 may comprise one or more additional steps of modulating the colour of the single combined heat map 1900.

In certain other embodiments, once the heat maps of the excluded areas are combined, a permissible area 1910 can be identified for each tooth on the single combined heat map 1900, the permissible area denoting suitable areas for the coupling point. The permissible area 1910 has a color based on the denoted colours of the bands within the heatmaps of the individual excluded areas. In certain embodiments, the permissible 1910 area is green.

In certain embodiments, either before or after the excluded heat maps are combined, the method may comprise determining an optimal area for the coupling point.
Optimal Area With reference to FIG. 20, there is shown a digital 3D representation 2000 of the lower teeth 16 of the lower arch form 20 with a number of optimal areas 2010 marked thereon as a heat map. Each optimal area 2010 is defined so as to locate an optimal coupling position for the attachment. Generally, the optimal area 2010 is based on areas of the tooth surface in which a normal axis of a given vector and an attachment axis of the attachment, is within a predefined optimal range. The method 1000 may comprise determining that the coupling point is in the optimal area.

The heat map comprises bands representative of a degree of relevance, including, for example, a first band 2020, a second band 2030 and a third band 2040. The first band 2020 indicates a region of most relevance in terms of level of optimality, i.e. the angle between the normal axis and the attachment axis is 0°. The first band 2020 may have a green color, for example. The third band 2040, indicates a region of least relevance in terms of optimality, i.e. the angle between the normal axis and the attachment axis is 90°. The third band 2040 may have a red color, for example. The second band 2030 indicates a region of medium relevance in terms of level of optimality. The second band 2030 may have a yellow color, for example.

The optimal area 2010 may be determined to be the first band 2020. The coupling point may be determined to be within the first band 2020 of the optimal area 2010.

In this regard, the method 1000 may comprise, the processor 550, determining, for each vector of the given tooth on the given arch form, an angle between (i) a normal axis of the vector of the mesh of the given tooth, and (ii) a attachment axis of the given tooth. If the determined angle matches a predetermined angle, such as 0°, that given vector is considered to be part of the optimal area.

The attachment axis may be determined in any manner. In certain embodiments, the tooth axis may be determined as described in U.S. Pat. No. 10,856,954.

In embodiments in which the optimal area 2010 is indicated as a heat map, the first band 1920 may be determined based on a first predetermined angle difference. An example of the first predetermined angle difference is 0°. The second band 2030 may be determined based on a second predetermined angle difference, the second predetermined angle difference being more than the first predetermined angle difference. An example second predetermined angle difference is 45°. The third band 2040 may be determined based on a third predetermined angle difference, the third predetermined distance being more than the second predetermined distance. An example third predetermined distance is 90°.

In this regard, the method 1000 may comprise, determining the plurality of bands of relevance of the optimal area 2010 by, for each location on the given tooth, determining an angle difference of a normal axis of the location with the attachment axis, and identifying whether the given location is within a certain band of relevance based on a predetermined angle range associated with the given band.

In certain embodiments, the attachment is the attachment 100 having the attachment axis 108.

Step 1050: Storing, in a Memory of the Computer System, the Determined Coupling Point The method 1000 may comprise, at step 1050, storing, in a memory of the computer system, such as the random access memory 570 of the computer system 410, the determined coupling point.

Instead, or in addition to, the method may also comprise, causing a display of the single combined heat map 1900 including the permissible area 1910 on a display device. In certain other embodiments, the method 1000 may comprise causing display of the heatmaps of any one or more of the first excluded area, the second excluded area, the third excluded area, the fourth excluded area, the fifth excluded area, the sixth excluded area and the seventh excluded area.

The processor may permit interaction with any of the heat maps defined herein to make adjustments thereto.

In some non-limiting implementations, in response to determining the coupling point, the method 1000 could also include displaying, on a display such as the interface device 420 operatively connected to the processor 550, a model of the teeth and the surrounding gingiva of the patient (not separately shown), and including the determined coupling point on one or more teeth. In such cases, the model could be configured to be manipulated by an operator of the interface device 420.

One non-limiting example method of manipulating the model, based at least in part on the determined coupling point may include determining, in response to manipulation of the model, an orthodontic treatment for the patient. In some cases, manipulation of the model includes simulating movement of one or more teeth based on the attachment coupled to given teeth at the coupling point of each given tooth.

The method 900 hence terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. Method for determining a coupling point for an attachment on a tooth of a subject, the method executable by a processor of a computer system, the method comprising:
    obtaining a digital 3D representation of the tooth to which the attachment will be coupled;
    obtaining attachment data indicative of the attachment to be coupled to the tooth;
    determining, on the digital 3D representation of the tooth, a plurality of excluded areas for the coupling point based on the digital 3D representation of the tooth and the attachment data;
    the plurality of excluded areas being defined by one or more of:
    (i) a first excluded area, within which if the attachment were to be coupled to the tooth, there would be contact between the attachment and one or more teeth of an opposite arch form;
    (ii) a second excluded area, within which if the attachment were to be coupled to the tooth, there would be contact between the attachment and one or more neighbouring teeth of the same arch form;
    (iii) a third excluded area on a lingual surface of the tooth,
    (iv) a fourth excluded area on a buccal surface of the tooth,
    (v) a fifth excluded area which is within a predetermined distance of a gum line of the tooth,
    (vi) a sixth excluded area which is within a predetermined distance of an edge of an appliance to be worn over the arch form,
    (vii) a seventh excluded area based on a desired 90° angle between a normal axis of a vector on the digital 3D representation of the tooth and a tooth axis of the tooth;
    determining the coupling point by identifying an area on the tooth which is not in the plurality of excluded areas; and
    storing, in a memory of the computer system, the determined coupling point.

2. The method of claim 1, wherein at least one of the excluded areas of the plurality of areas comprises a heat map indicative of degrees of exclusion.

3. The method of claim 2, further comprising normalizing gradients within each heatmap and displaying maximum values of normalized gradients as the heat map.

4. The method of claim 2, wherein the heat map comprises one or more bands representative of the degrees of exclusion.

5. The method of claim 1, further comprising determining the first excluded area by:
    obtaining a digital 3D representation of an opposite arch form;
    for different locations on the tooth, determining a distance from a closest point on a plurality of teeth of the opposite arch form, based on the digital 3D representations of the tooth and the opposing arch form; and
    determining the first excluded area as those locations on the tooth which are within a predetermined distance from the determined closest point of the opposing teeth.

6. The method of claim 5, wherein the digital 3D representations of the tooth and the opposite arch form comprise meshes indicative of a surface of the tooth and the opposing teeth, and determining the closest point on the plurality of teeth of the opposite arch form comprises, for each vertex of the digital 3D representation of the tooth, identifying the closest vertex of the digital 3D representation of the opposing arch form.

7. The method of claim 1, further comprising determining the second excluded area by:
    for different locations on the tooth, determining a distance from a closest point on a neighboring tooth, based on the digital 3D representation of the arch form; and
    determining the second excluded area as those locations on the tooth which are within a predetermined distance from the determined closest point of the neighboring tooth.

8. The method of claim 7, wherein the digital 3D representation of the arch form comprises a mesh indicative of a surface of the tooth and the neighboring tooth, and determining the closest point on the neighboring tooth comprises, for each vertex of the digital 3D representation of the tooth, identifying the closest vertex of the digital 3D representation of the neighboring tooth.

9. The method of claim 1, further comprising determining the third excluded area by:
    determining a distal-mesial plane extending through a tooth axis of the tooth; and
    determining a lingual side of the distal-mesial plane on the tooth as the third excluded area.

10. The method of claim 9, further comprising displacing the determined distal-mesial plane away from the lingual side by a predetermined distance, and determining the lingual side of the displaced distal-mesial plane as the third excluded area.

11. The method of claim 1, further comprising determining the fourth excluded area by:
    obtaining a normal axis of each vector of the mesh of the tooth; and
    determining an angle of the normal axis with a Z axis of a distal-mesial plane extending through a tooth axis of the tooth; and
    determining a lingual side of the distal-mesial plane on the tooth as the fourth excluded area.

12. The method of claim 1, further comprising determining the fifth excluded area by:
    obtaining a gum line associated with the tooth in the arch form; and
    displacing the gum line by a given distance along a front surface of the tooth, the gum line and the displaced gum line defining the fifth excluded area.

13. The method of claim 1, further comprising determining the sixth excluded area by:
    obtaining an appliance edge position along the tooth of the edge of the appliance when worn over the arch form; and displacing the appliance edge position by a predetermined distance along a front surface of the tooth, the gum line and the displaced appliance edge position defining the sixth excluded area.

14. The method of claim 1, further comprising determining the seventh excluded area by:

obtaining a normal axis of each vector of the mesh of the tooth; and determining a given vector as forming part of the seventh excluded area if an angle of the normal axis with a tooth axis of the tooth is within a predetermined angle range.

15. The method of claim 1, further comprising:

determining at least one optimal area for coupling the attachment to the tooth, wherein the digital 3D representation comprises a mesh representative of a surface of the tooth, the determining comprising:

obtaining, for each vector of the mesh of the tooth, a normal vector;

obtaining an attachment axis of the attachment;

defining the at least one optimal area by determining that a given vector of the mesh is within the at least one optimal area if an angle between the normal vector and the attachment axis is within a predefined range; and determining the coupling point on the tooth based on it being in the at least one optimal area, and not within any of the plurality of excluded areas.

16. The method of claim 1, further comprising displaying and/or storing the determined coupling point.

17. Method for determining a coupling point for an attachment on a tooth of a subject, the method executable by a processor of a computer system, the method comprising:

obtaining a 3D representation of the tooth of the subject;

obtaining attachment data indicative of the attachment to be coupled to the tooth;

determining, on the 3D representation of the tooth, one or more permissible areas for the coupling point based on the 3D representation of the tooth and the attachment data, at least some of the permissible areas having been determined by determining an excluded area on the tooth, and determining areas that are not excluded areas as permissible areas on the tooth, the excluded area being defined by one or more of:

(i) a first excluded area, within which if the attachment were to be coupled to the tooth, there would be contact between the attachment and one or more teeth of an opposite arch form;

(ii) a second excluded area, within which if the attachment were to be coupled to the tooth, there would be contact between the attachment and one or more neighbouring teeth of the same arch form;

(iii) a third excluded area on a lingual surface of the tooth, (iv) a fourth excluded area on a buccal surface of the tooth, (v) a fifth excluded area which is within a predetermined distance of a gum line of the tooth, (vi) a sixth excluded area which is within a predetermined distance of an edge of an appliance to be worn over the arch form, (vii) a seventh excluded area based on a desired 90° angle between a normal axis of a vector on the 3D representation of the tooth and a tooth axis of the tooth; and determining the coupling point by identifying an area on the tooth which is in the one or more of permissible areas.

* * * * *